United States Patent
Kerr et al.

(10) Patent No.: US 8,970,471 B2
(45) Date of Patent: *Mar. 3, 2015

(54) COMPUTER LIGHT ADJUSTMENT

(71) Applicant: Apple Inc., Cupertino, CA (US)

(72) Inventors: Duncan Kerr, San Francisco, CA (US); Bas Ording, San Francisco, CA (US); Greg Christie, San Jose, CA (US); Imran Chaudhri, San Francisco, CA (US); Marcel van Os, San Francisco, CA (US); Nick King, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/946,534

(22) Filed: Jul. 19, 2013

(65) Prior Publication Data

US 2014/0021869 A1    Jan. 23, 2014

Related U.S. Application Data

(63) Continuation of application No. 12/949,563, filed on Nov. 18, 2010, now Pat. No. 8,531,386, which is a continuation of application No. 11/737,121, filed on Apr. 18, 2007, now Pat. No. 7,839,379, which is a (Continued)

(51) Int. Cl.
*G09G 3/36* (2006.01)
*G09G 5/10* (2006.01)

(Continued)

(52) U.S. Cl.
CPC ............... *G09G 5/10* (2013.01); *G06F 1/1616* (2013.01); *G09G 3/3406* (2013.01); *G09G 2320/0633* (2013.01); *G09G 2330/021* (2013.01); *G09G 2360/144* (2013.01); *H05B 37/0218* (2013.01)
USPC .......................................... 345/102; 345/169

(58) Field of Classification Search
CPC ............... G06F 1/1616; G09G 3/3406; G09G 2360/144
USPC .................. 345/102, 156–157, 168–173, 207, 345/901–905; 341/20–23; 349/61–71; 361/679.08–679.2, 679.4–679.45, 361/679.55–679.56; 362/97.1–97.4
See application file for complete search history.

(56) References Cited

U.S. PATENT DOCUMENTS

| | | |
|---|---|---|
| 4,090,216 A | 5/1978 | Constable |
| 4,386,345 A | 5/1983 | Narveson et al. |

(Continued)

FOREIGN PATENT DOCUMENTS

| | | |
|---|---|---|
| JP | 10-188452 | 7/1998 |
| JP | 2001299980 | 10/2001 |

(Continued)

OTHER PUBLICATIONS

"12.1" 925 Candela Mobile PC, www.lcdhardware.com/panel/12_1_panel/default.asp, downloaded Dec. 19, 2002.

(Continued)

*Primary Examiner* — Michael Pervan
(74) *Attorney, Agent, or Firm* — Kendall P. Woodruff

(57) ABSTRACT

A computing device is disclosed. The computing device includes a light source configured to output light. The computing device also includes a light sensor configured to measure the level of light surrounding the computing device. The computing device further includes a control mechanism operatively coupled to the light source and light sensor and configured to adjust the level of output light based on the measured level of light surrounding the computing device.

18 Claims, 11 Drawing Sheets

Related U.S. Application Data continuation of application No. 10/402,311, filed on Mar. 26, 2003, now Pat. No. 7,236,154.

(60) Provisional application No. 60/436,205, filed on Dec. 24, 2002.

(51) Int. Cl.
*G06F 1/16* (2006.01)
*G09G 3/34* (2006.01)
*H05B 37/02* (2006.01)

(56) References Cited

U.S. PATENT DOCUMENTS

| | | | |
|---|---|---|---|
| 4,451,849 A | 5/1984 | Fuhrer | |
| 4,589,022 A | 5/1986 | Prince et al. | |
| 4,674,743 A | 6/1987 | Hirano | |
| 4,692,915 A | 9/1987 | Moriya et al. | |
| 4,776,323 A | 10/1988 | Spector | |
| 4,849,863 A | 7/1989 | Gallegos | |
| 4,939,611 A | 7/1990 | Connolly | |
| 5,001,462 A | 3/1991 | Seemann et al. | |
| 5,137,501 A | 8/1992 | Mertesdorf | |
| 5,267,942 A | 12/1993 | Saperston | |
| 5,313,187 A | 5/1994 | Choi et al. | |
| 5,313,188 A | 5/1994 | Choi et al. | |
| 5,343,871 A | 9/1994 | Bittman et al. | |
| 5,406,305 A | 4/1995 | Shimomura | |
| 5,456,032 A | 10/1995 | Matsumoto et al. | |
| 5,465,729 A | 11/1995 | Bittman et al. | |
| 5,533,947 A | 7/1996 | Tomlinson et al. | |
| 5,592,143 A | 1/1997 | Romney et al. | |
| 5,662,117 A | 9/1997 | Bittman | |
| 5,670,985 A | 9/1997 | Cappels, Sr. et al. | |
| 5,684,513 A | 11/1997 | Decker | |
| 5,690,411 A | 11/1997 | Jackman | |
| 5,726,672 A | 3/1998 | Hernandez et al. | |
| 5,779,348 A | 7/1998 | Interlicchio | |
| 5,815,225 A | 9/1998 | Nelson | |
| 5,836,673 A | 11/1998 | Lo | |
| 5,879,076 A | 3/1999 | Cross | |
| 5,892,573 A | 4/1999 | Takahashi et al. | |
| 5,952,992 A | 9/1999 | Helms | |
| 5,986,200 A | 11/1999 | Curtin | |
| 6,001,048 A | 12/1999 | Taylor | |
| 6,064,372 A | 5/2000 | Kahkoska | |
| 6,146,006 A | 11/2000 | Cross | |
| 6,161,944 A | 12/2000 | Leman | |
| 6,179,432 B1 | 1/2001 | Zhang | |
| 6,191,939 B1 | 2/2001 | Burnett | |
| 6,217,183 B1 | 4/2001 | Shipman | |
| 6,230,047 B1 | 5/2001 | McHugh | |
| 6,336,727 B1 | 1/2002 | Kim | |
| 6,379,013 B1 | 4/2002 | Bechtel et al. | |
| 6,467,924 B2 | 10/2002 | Shipman | |
| 6,532,152 B1 | 3/2003 | White et al. | |
| 6,538,567 B2 | 3/2003 | Stewart | |
| 6,544,200 B1 | 4/2003 | Smith et al. | |
| 6,549,179 B2 | 4/2003 | Youngquist et al. | |
| 6,582,342 B2 | 6/2003 | Kaufman | |
| 6,661,655 B2 * | 12/2003 | Yin | 361/679.48 |
| 6,672,991 B2 | 1/2004 | O'Malley | |
| 6,717,376 B2 | 4/2004 | Lys et al. | |
| 6,746,247 B2 | 6/2004 | Barton | |
| 6,762,741 B2 | 7/2004 | Weindorf | |
| 6,768,066 B2 | 7/2004 | Wehrenberg | |
| 6,798,395 B1 * | 9/2004 | Yamauchi et al. | 345/102 |
| 6,850,776 B1 | 2/2005 | Sandelius et al. | |
| 6,870,529 B1 | 3/2005 | Davis | |
| 6,897,624 B2 | 5/2005 | Lys et al. | |
| 6,911,971 B2 | 6/2005 | Suzuki | |
| 6,918,677 B2 | 7/2005 | Shipman | |
| 6,950,087 B2 | 9/2005 | Knox et al. | |
| 6,956,564 B1 | 10/2005 | Williams | |
| 6,977,335 B2 | 12/2005 | Georges et al. | |
| 7,038,118 B1 | 5/2006 | Gimarc | |
| 7,060,008 B2 | 6/2006 | Watterson et al. | |
| 7,078,607 B2 | 7/2006 | Alferness | |
| 7,083,295 B1 | 8/2006 | Hanna | |
| 7,135,637 B2 | 11/2006 | Nishitani et al. | |
| 7,156,773 B2 | 1/2007 | Takai et al. | |
| 7,164,076 B2 | 1/2007 | McHale et al. | |
| 7,177,672 B2 | 2/2007 | Nissila | |
| 7,179,984 B2 | 2/2007 | Nishitani et al. | |
| 7,183,480 B2 | 2/2007 | Nishitani et al. | |
| 7,207,935 B2 | 4/2007 | Lipo | |
| 7,218,226 B2 | 5/2007 | Wehrenberg | |
| 7,224,282 B2 | 5/2007 | Terauchi et al. | |
| 7,236,154 B1 | 6/2007 | Kerr et al. | |
| 2001/0026413 A1 | 10/2001 | Kisaka et al. | |
| 2002/0050975 A1 | 5/2002 | Knox et al. | |
| 2002/0110673 A1 * | 8/2002 | Heydarpour et al. | 428/209 |
| 2002/0152045 A1 | 10/2002 | Dowling | |
| 2003/0038785 A1 | 2/2003 | Suzuki | |
| 2003/0133284 A1 | 7/2003 | Chipchase et al. | |
| 2003/0159566 A1 | 8/2003 | Sater et al. | |
| 2004/0012556 A1 | 1/2004 | Yong et al. | |
| 2004/0044291 A1 | 3/2004 | Yasushi et al. | |
| 2004/0077934 A1 | 4/2004 | Massad | |
| 2004/0127335 A1 | 7/2004 | Watterson et al. | |
| 2004/0252397 A1 | 12/2004 | Hodge et al. | |
| 2005/0126370 A1 | 6/2005 | Takai et al. | |
| 2005/0215846 A1 | 9/2005 | Elliott | |
| 2005/0288159 A1 | 12/2005 | Tackett | |
| 2006/0088228 A1 | 4/2006 | Marriott et al. | |
| 2006/0102171 A1 | 5/2006 | Gavish | |
| 2006/0107822 A1 | 5/2006 | Bowen | |
| 2006/0111621 A1 | 5/2006 | Coppi et al. | |
| 2006/0112808 A1 | 6/2006 | Kiiskienen et al. | |
| 2006/0169125 A1 | 8/2006 | Ashkenazi et al. | |
| 2006/0185502 A1 | 8/2006 | Nishitani et al. | |
| 2006/0234832 A1 | 10/2006 | Toyama et al. | |
| 2006/0243120 A1 | 11/2006 | Takai et al. | |
| 2006/0272480 A1 | 12/2006 | Gimarc | |
| 2006/0277474 A1 | 12/2006 | Robarts et al. | |
| 2006/0288846 A1 | 12/2006 | Logan | |
| 2007/0027000 A1 | 2/2007 | Shirai et al. | |
| 2007/0033295 A1 | 2/2007 | Marriott | |
| 2007/0044641 A1 | 3/2007 | McKinney et al. | |
| 2007/0060446 A1 | 3/2007 | Asukai et al. | |
| 2007/0074617 A1 | 4/2007 | Vergo | |
| 2007/0074619 A1 | 4/2007 | Vergo | |
| 2007/0079691 A1 | 4/2007 | Turner | |
| 2007/0113725 A1 | 5/2007 | Oliver et al. | |
| 2013/0048837 A1 | 2/2013 | Pope | |

FOREIGN PATENT DOCUMENTS

| | | |
|---|---|---|
| JP | 2001-307413 | 11/2001 |
| JP | 2001306071 | 11/2001 |
| JP | 2002073018 | 3/2002 |
| JP | 2002-298496 | 10/2002 |
| JP | 2003177749 | 6/2003 |
| JP | 2003177750 | 6/2003 |
| JP | 2004113552 | 4/2004 |

OTHER PUBLICATIONS

"Active MP3 DJ Studio," downloaded Oct. 28, 2004, http://www.multimediasoft.com/amp3dj/.

"Advanced Safety Equipment; Led Armband," www.advancedsafetyequipment.com/armband.html, downloaded Jul. 12, 2004.

"ADXL311—Low Cost, Ultra Compact, ±2 g, Dual Axis Accelerometer," downloaded Nov. 22, 2004, http://www.analog.com/en/prod/0,,764_800_ADXL311,00.html.

"BL82 Series Backlit Keyboards," www.tg3electronics.com/products/backlit/backlit.htm, downloaded Dec. 19, 2002.

"DJ Software Pro—Mix Vibes Pro 4," downloaded Oct. 28, 2004, http://www.mixvibes.com/pages/mixvibespro4.html.

"Honor for StepMan in the design competition the mVs 2004," downloaded Oct. 20, 2004, http://216.239.37.104/translate_c?hl=en & sl=de&u=http://www.innovations-report.de/htm . . . .

(56) References Cited

OTHER PUBLICATIONS

"How Music Affects Your Workout," downloaded Oct. 28, 2004, http://www.tinajuanfitness.info/articles/art082897.html.

"Industrial Keyboards & Pointing Devices," www.stealthcomputer.com/peripherals_oem.htm, downloaded Dec. 19, 2002.

"Introducing GarageBand," downloaded Oct. 28, 2004, http://www.apple.com/ilife/garageband/.

"Lumitex. Inc.; LCD Backlighting." www.lumitex.com/lcd_backlighting.html. downloaded Jul. 12, 2004.

"Mixing & DJ Software for the Mac," downloaded Oct. 28, 2004, http://www.mp3-mac.com/Pages/MixDJ.html.

"MP3Run 256 MB Digital Audio Player," http://www.nike-philips.com/product_details.jsp?lang=enj&product=MP3RUNpsa260, downloaded Oct. 28, 2004.

"Phase Vocoder," downloaded Oct. 20, 2004, http://www.mti.dmu.ac.uk/EARS/Data/node325.html.

"Poly-Optical UniGlo provides long life, low power, inert, maintenance free backlighting for all switch and control panel designs," www.poly-optical.com/membrane_switches.html., downloaded. Dec. 19, 2002.

"Protexion Plus Reflective Safety Harness/vest," http://protexion.alain-pelletier.com, downloaded Jul. 12, 2004.

"Table of Contents," Oct. 2001, No. 10, Sensors & Transducers e-Digest (S&T), downloaded Oct. 14, 2004, http://www.sensorsportal.com/HTML/DIGEST/Digest_Oct_2001.htm.

"TAOS, Inc., Announces Industry's First Ambient Light Sensor to Convert Light Intensity to Digital Signals," www.taosinc.com/pressrelease_090902.htm, downloaded Jan. 23, 2003.

"The Mixer," downloaded Oct. 28, 2004, http://www.dj.deft.ukgateway.net/mainpages/mixers.htm.

"The new iTunes," downloaded Oct. 28, 2004, http://www.apple.com/ilife/itunes/.

"The PaceMaker Plug-in v2.02," Oct. 11, 2004, downloaded Oct. 20, 2004, http://sky.prohosting.com/oparviai/pacemaker/.

"Toughbook 28, Powerful, Rugged and Wireless," www.panasonic.com/computer/notebook/html/01a_s8.htm, downloaded Dec. 19, 2002.

"Tracer 2000 Computer," www.pst911.com/tracer.html, downloaded Dec. 19, 2002.

"Traktor DJ Studio 2 Ready for iTunes and iPod," downloaded Nov. 22, 2004, http://www.native-instruments.com/index.php?id=2270&ztype=1.

"Traktor DJ Studio 2.0 with OS X Support Shipping," Press Release dated Nov. 15, 2002, http://new.harmony-central.com/Newp/2002/Traktor-DJ-Studio-20.html.

"Traktor is the best Mp3 DJ Software," downloaded May 25, 2005, http://www.dj-tips-and-tricks.com/mp3-dj-software.html.

"Treadmill Programs," downloaded Oct. 28, 2004, http://us.home.lifefitness.com/content.cfm/treadmillprograms.

"VIP Global Marketing: Safety Lights," www.vipglobal.com/safety-lights.htm, downloaded Jul. 12, 2004.

"Virtual DJ Studio—MP3 Mixer," downloaded Oct. 28, 2004, http://www.vdj3.com/.

"What is music?" downloaded Oct. 28, 2004, http://www.mfiles.co.uk/other-what-is-music.htm.

"When it Comes to Selecting a Projection TV, Toshiba Makes Everything Perfectly Clear, Previews of New Releases," www.bestbuy.com/HomeAudioVideo/Specials/ToshibaTVFeatures.asp, downloaded Jan. 23, 2003.

"Why Buy: ThinkPad," www.pc.ibm.com/us/thinkpad/easeofuse.html, downloaded Dec. 19, 2002.

Bociurkiw, Michael, "Product Guide: Vanessa Matz," www.forbes.com/asap/2000/1127/vmartz_print.html, Nov. 27, 2000.

Eluminx Home web page, www.eluminx.com, downloaded Dec. 19, 2002.

HDK Acceleration Sensor, Hokuriku ACS010B specification, pp. 1-2.

Mathias Mainka, "StepMan—matching music to your moves," Jan. 2004, CG Topics.

MK2001MPL (HDD1212) Hard Disk Drive, Product Specification, Toshiba Storage Device Division, Toshiba Corporation, Sep. 2000.

"What is music?" downloaded. Oct. 28, 2004, http://www.mfiles.co.uk/other-what-is-music.htm.

Notice of allowance dated Mar. 6, 2008 in U.S. Appl. No. 10/889,933.

Office Action dated Oct. 14, 2008 in U.S. Appl. No. 10/889,933.

\* cited by examiner

COMPUTER LIGHT ADJUSTMENT

CROSS REFERENCE TO RELATED APPLICATIONS

This application is a continuation of co-pending U.S. patent application Ser. No. 12/949,563, filed on Nov. 18, 2010, and entitled "COMPUTER LIGHT ADJUSTMENT," which is a continuation of U.S. patent application Ser. No. 11/737,121, filed on Apr. 18, 2007, and entitled "COMPUTER LIGHT ADJUSTMENT," which is a continuation of U.S. patent application Ser. No. 10/402,311, filed Mar. 26, 2003, and entitled "COMPUTER LIGHT ADJUSTMENT", now U.S. Pat. No. 7,236,154, that, in turn, claims priority to U.S. Provisional Application No. 60/436,205, filed on Dec. 24, 2002 and entitled "COMPUTER LIGHT ADJUSTMENT," each of which is herein incorporated by reference in their entirety.

FIELD OF THE INVENTION

The present invention relates generally to computing devices and/or systems. More particularly, the present invention relates to improved features for controlling light associated with the computing devices and/or systems.

DESCRIPTION OF THE RELATED ART

Portable computing devices such as notebook computers generally consist of a lid and a base, each of which carries various components used to operate the notebook computer. By way of example, the base may include a hard drive, a modem, a processor, a disk drive, memory, a keyboard, a track pad, buttons and the like, and the lid may include a display such as a liquid crystal display (LCD). The base may also include a battery for supplying power to the components of the notebook computer. The battery is often quite small and therefore generally only has enough power to keep the notebook computer running for a few hours. As should be appreciated, in order to operate effectively, each component consumes some of the power thereby reducing the life of the battery. One of the biggest consumers of power is the display.

Displays are configured to give visual feedback to a user. For example, the displays may display textual or graphical information such as graphical user interface (GUI). Displays typically include controls that allow a user to adjust characteristics of the display screen such as brightness. By way of example, the controls may be implemented through keys disposed on a keyboard. The user typically adjusts the brightness by incrementally or continuously holding down the key. The controls may also be implemented through buttons or switches located on the outside of the notebook computer. Some external displays such as those utilizing cathode ray tubes (CRT), as for example televisions and computer monitors, may also include controls that allow a user to adjust contrast. Moreover, some televisions include control mechanisms that automatically adjust the brightness level of the television according to the ambient light around the television.

Notebook computers also give visual feedback to users via small indicators positioned on the notebook computer. By way of example, some indicators use light to indicate that a notebook computer is turned on/off or that the notebook computer is in a sleep mode. External lights may be used in some cases to provide light to the keyboard of the notebook computer so that the keys may be seen in low light conditions.

Although light devices of notebook computers typically work well, there are continuing efforts to improve their form, feel and functionality. For example, it may be desirable to control the light devices of a notebook computer according to the surroundings and environment in which they are used.

SUMMARY OF THE INVENTION

The invention relates, in one embodiment, to a computer system. The system includes a processor configured to execute instructions and to carry out operations associated with the computer system. The computing device also includes an input/output controller operatively coupled to the processor and configured to control interactions with one or more input/output devices that are coupled to the computer system, one or more light sources configured to emit light around the computer system, a light controller operatively coupled to the processor and configured to process light information associated with the one or more light sensors and the one or more light sources, a display device configured to display text and graphics; a display controller operatively coupled to the processor and configured to process display commands to produce text and graphics on the display device, and a program storage block operatively coupled to the processor and configured to store data being used by the computer system, the program storage block storing an illumination program for controlling how the one or more light sources are illuminated, the illumination program containing illumination profiles for each of the light sources of the computing system, the illumination profiles describing the relationship between the light output of the one or more light sources and the measured ambient light level, the illumination profiles being accessed through a light control menu, which is viewed on the display device as part of a graphical user interface. By way of example, the computing device may correspond to a portable computing device such as a notebook computer.

The invention relates, in another embodiment, to a computing device. The computer device includes, at least, a first light source capable of outputting light in order to illuminate a first component of the computing device, a second light source capable of outputting light in order to illuminate a second component of the computing device, the second component being distinct from the first component, a light sensor configured to measure the level of light surrounding the computing device; and a control mechanism operatively coupled to the first and second light sources and the light sensor and configured to adjust the level of out put light from the first and second light sources based on the measured level of light surrounding the computing device and first and second illumination profiles associated with the first and second light sources, the first illumination profile being different than the second illumination profile.

The invention relates, in yet another embodiment, to a method of illuminating multiple light sources associated with a notebook computer. The method is includes at least the following steps: determining the ambient light level, automatically adjusting the light intensity of a first light source of a first component of the notebook computer based on the ambient light level, automatically adjusting the light intensity of a second light source of a second component of the notebook computer based on the ambient light level, storing a first illumination profile for the first light source, the first illumination profile defining a relationship between ambient light levels and the light intensity of the first light source, and storing a second illumination profile for the second light source, the second illumination profile defining a relationship between the ambient light level and the light intensity of the second light source, the second illumination profile being different than the first illumination profile. In the described embodiment, the light intensity of the first light source is adjusted according to the first illumination profile and wherein the light intensity of the second light source is adjusted according to the second illumination profile.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention generally pertains to controlling light sources associated with various components of a computing device or system. In particular, controlling the intensity of light outputted by the light sources based on the level of ambient light surrounding the computing device or system. One aspect of the invention relates to automatically adjusting a light source associated with a display device according to the ambient light level. As should be appreciated, in order for the display to be seen properly, the light therefrom generally has to be bright in high ambient light and relatively dim in low ambient light (e.g., darkness). Another aspect of the invention relates to automatically adjusting a light source associated with a keyboard according to the ambient light level. As should be appreciated, in order for the keyboard to be seen properly, the light therefrom generally has to be bright in low ambient light. In one particular embodiment, the keyboard light comes on in low ambient light thereafter adjusts to the ambient light level and then automatically shuts off in brighter ambient light. Yet another aspect of the invention relates to automatically adjusting a light source associated with an indicator according to the ambient light level.

The invention is particular suitable for use in portable computers such as notebook or laptop computers where substantial battery life can be saved by adjusting the intensity of light in order to reduce the power consumption of the light sources. The amount saved generally depends on the ambient light level. By way of example, the life of the battery may be increased up to 40% when automatically adjusting the light sources described above. In addition, the invention provides light in a controlled manner so that components of the portable computer can be seen properly and clearly. For example, the light may illuminate a component such as a keyboard so that it can be used in low light conditions (e.g., in the dark).

Embodiments of the invention are discussed below with reference to FIGS. 1-16. However, those skilled in the art will readily appreciate that the detailed description given herein with respect to these figures is for explanatory purposes as the invention extends beyond these limited embodiments.

Figure 1:
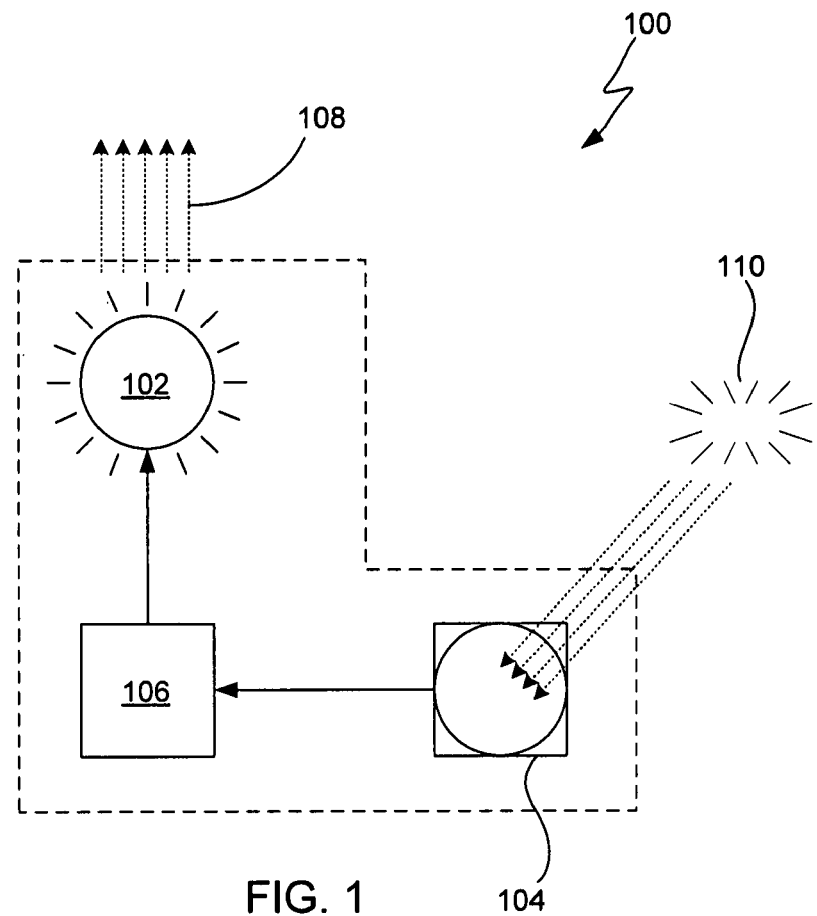
FIG. 1 is a block diagram of a computing device, in accordance with one embodiment of the present invention.

FIG. 1 is a block diagram of a computing device 100, in accordance with one embodiment of the present invention. The computing device 100 is generally configured to process, send, retrieve and/or store data. By way of example, the computing device may correspond to desktop computers (both segmented and all-in-one machines), portable computers (e.g., laptops), handhelds (e.g., media players, personal digital assistants and mobile phones) or the like. As shown, the computing device 100 includes a light source 102 and a light sensor 104, both of which are operatively coupled to a control mechanism 106. The light source 102, light sensor 104 and control mechanism 106 make up a light adjustment circuit that is configured to effect lighting associated with the computing device 100 in a non-trivial manner.

The light source 102 is generally configured to output light 108 so that it can be seen by a user of the computing device 100. For example, the light source 102 may be used to light up many types of light devices such as indicators, displays, keyboards, buttons, connectors and the like. With regards to indicators, keyboards buttons, and connectors the light source may correspond to a light emitting diode (LED). With regards to the display, the light source may correspond to a display tube (e.g., cathode ray tube) or a display panel such as those used in liquid crystal displays (LCD). The light sensor 106, on the other hand, is configured to receive and measure the level of light 110 that surrounds the computing device 100 during use, as for example, light that is produced by incandescent, sunlight, fluorescents, and the like. This type of light is sometimes referred to as "ambient light." By way of example, the light sensor 106 may correspond to a photodiode, phototransistor, photoresistor or the like. An example of an illuminated connector may be found in U.S. Pat. No. 6,357,887, titled "Housing for a Computing Device", issued Mar. 19, 2002, which is herein incorporated by reference.

Moreover, the control mechanism 104 is generally configured to adjust the level of the light 108 based on the measured level of the light 110. For example, depending on the light level of light 110, the control mechanism 106 may increase or reduce the power that is delivered to the light source 102 thereby effecting the light intensity of the light source 102. The intensity of the outputted light 108 is generally set at a level that differentiates it from the ambient light 110, i.e., provide sufficient contrast between the light being outputted by the light source 102 and the ambient light surrounding the computing device 100. In one particular embodiment, and referring to FIG. 2, the intensity of the outputted light 108 is configured to be high in high ambient light 110 and low in low ambient light 110. This is typically done so as to allow a user to easily view the outputted light 108 when using the computing device 100, i.e., more light is needed when the ambient light level is bright and not as much light is needed when the ambient light level is dark. This is also done to reduce the power consumption of the computing device 100 (as some users may leave light devices, i.e., displays, on maximum brightness). This may be advantageous in portable devices that include batteries, i.e., reducing the power consumption may increase battery life. Although this particular embodiment is shown and described, it should be noted that it is not a limitation and that the relationship between light intensity and ambient light level may vary according to the specific needs of each device. For example, in some cases, the intensity of the outputted light may be configured to be low in high ambient light 110 and high in low ambient light 110 (e.g., this may allow the light to be seen in darkness). By way of example, the ambient light level may range from about 0 lux (e.g., darkness) to about 1000 lux (e.g., a very bright room).

The control mechanism 110 may be a dedicated block or it may be a part of the control system that controls other functions of the computing device 100. By way of example, it may correspond to a micro controller and/or a processor.

Figure 3:
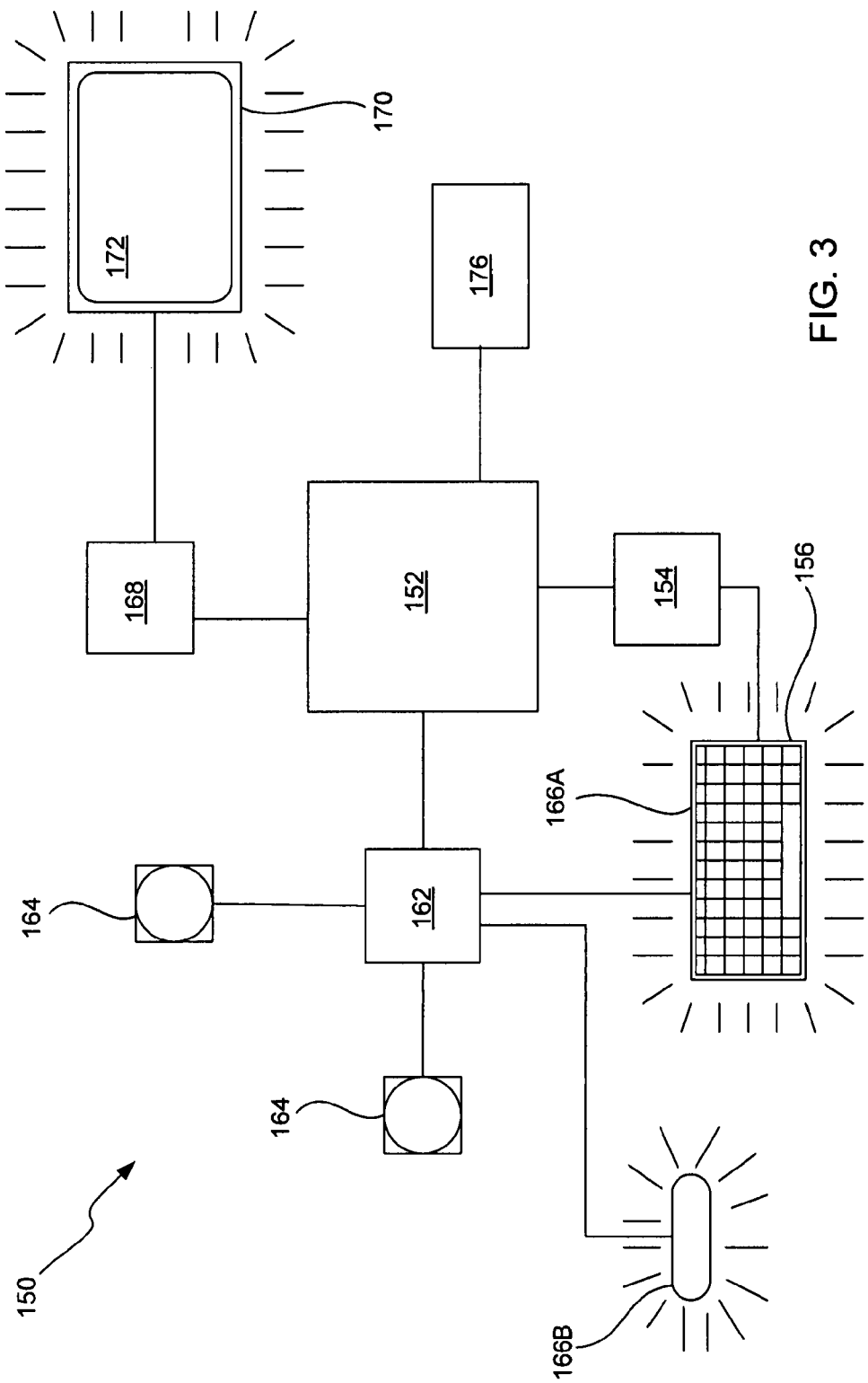
FIG. 3 is a block diagram of a computer system, in accordance with one embodiment of the present invention.

FIG. 3 is a block diagram of a computer system. 150, in accordance with one embodiment of the present invention. By way of example, the computer system 150 may correspond to the computing device 100 shown in FIG. 1. The computer system 150 generally includes a processor 152 (e.g., CPU or microprocessor) configured to execute instructions and to carry out operations associated with the computer system 150. For example, using instructions retrieved for example from memory, the processor may control the reception and manipulation of input and output data between components of the computer system 150. In most cases, the processor 152 executes instruction under the control of an operating system or other software. The processor can be a single-chip processor or can be implemented with multiple components.

The computer system 150 also includes an input/output (I/O) controller 154 that is operatively coupled to the processor 152. The (I/O) controller 154 may be integrated with the processor 152 or it may be a separate component as shown. The I/O controller 154 is generally configured to control interactions with one or more I/O devices 1.56 that can be coupled to the computer system 150. The I/O controller 154 generally operates by exchanging data between the computer system 154 and I/0 devices 156 that desire to communicate with the computer system 150. In some cases, the I/O devices 156 may be connected to the I/O controller 154 through wired connections such as through wires or cables. In other cases, the I/O devices 156 may be connected to the I/O controller 154 through wireless connections. By way of example, the I/O devices 156 may be internal or external devices such as hard drives, disk drives (e.g., floppy, CD, DVD, etc.), keyboards, mice, track balls, touch pads, printers, scanners, speakers, video cameras, MP3 players and the like. The I/O devices 156 may also be network-related devices such as network cards or modems. In the illustrated embodiment, the I/O device 156 is an illuminable keyboard, as for example, a backlit keyboard.

The computer system 150 also includes a light controller 162 that is operatively coupled to the processor 152. The light controller 162 may be integrated with the processor 152 or it may be a separate component as shown. The light controller 162 is configured to process light information associated with one or more light sensors 164 and one or more light sources 166. The light sensors 164 are generally configured to measure the ambient light level surrounding the computer system 150 and the light sources 166 are generally configured to emit light. By way of example, the light sensor may be configured to measure the ambient light level between about 0 lux (e.g., darkness) to about 1000 lux (e.g., a very bright room). In most cases, the light controller 162 operates by exchanging data between the light sensors 164, light sources 166 and the processor 152, i.e., the light controller 162 directs the measured output from the light sensors to the processor 152 and it directs light instructions from the processor 152 to the one or more light sources 166. In the illustrated embodiment, the computer system includes a pair of the light sensors 164. It is generally believed that using multiple light sensors produces a more accurate reading of the ambient light surrounding the computer system (e.g., average). It should be noted that two light sensors is not a limitation and that one or more light sensors may be used.

The light sources may be widely varied. By way of example, the light sources may be one or more light emitting diodes (LED), light emitting semiconductor dies, lasers, incandescent light bulbs, fluorescent light bulbs, neon tubes, liquid crystal displays (LCD), and the like. Furthermore, the location of the light sources may be widely varied. The light sources may be located in almost any component of the computer system 150. For example, the light sources may be contained in one or more of the I/O devices described above or within a housing of the computer system 150, as for example, the housing that contains the processor 152. In the illustrated embodiment, a first light source 166A emits light for lighting up the keyboard 156, and a second light source 166B emits light for lighting up an indicator 157 of the computer system 150. By way of example, the indicator 157 may be a sleep indicator that alerts users when the computer system is in a sleep mode. In most cases, the light sources 166A and 166B correspond to LEDs.

The computer system 150 also includes a display controller 168 that is operatively coupled to the processor 152. The display controller 168 may be integrated with the processor 152 or it may be a separate component as shown. The display controller 168 is configured to process display commands to produce text and graphics on a display device 170. By way of example, the display device 170 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like. In the illustrated embodiment, the display device corresponds to a liquid crystal display (LCD) that contains a light source 172 for delivering light to the LCD. In most cases, the light source 172 corresponds to a light panel such as a fluorescent light panel that emits light behind (and sometimes beside) the remaining layers or panels of the LCD (e.g., polarizing filters, liquid crystal cells, color filters, glass plate).

Although not shown, the computer system 150 may include one or more media bays (expansion bays) may be used to receive media bay devices (expansion bay devices) to provide greater resources to the computer system 150. As examples, the types of devices include a floppy drive, a hard drive, a CD-ROM drive, a DVD drive, or a battery. The media bays are typically externally accessible from to the computer system 150 so that media bay devices can be easily be inserted into the media bays or removed from the media bays. The removability of the media bay devices allows a few media bays to support a variety of different types of devices in a flexible manner.

In most cases, the processor 152 together with an operating system operates to execute computer code and produce and use data. The computer code and data may reside within a program storage block 176 that is operatively coupled to the processor 152. Program storage block 176 generally provides a place to hold data that is being used by the computer system 150. By way of example, the program storage block may include Read-Only Memory (ROM), Random-Access Memory (RAM), hard disk drive and/or the like. The computer code and data could also reside on a removable program medium and loaded or installed onto the computer system when needed. Removable program mediums include, for example, CD-ROM, PC-CARD, floppy disk, magnetic tape, and a network component. As is generally well known, RAM is used by the processor as a general storage area and as scratch-pad memory, and can also be used to store input data and processed data. ROM can be used to store instructions or program code followed by the processor as well as other data. Floppy and hard disk drives can be used to store various types of data. Floppy disk drive facilitates transporting such data to other computer systems, and hard disk drives permit fast access to large amounts of stored data.

In one embodiment, program storage block 176 is configured to store an illumination program for controlling how the lights sources, as for example, the light sources associated with the keyboard 156, indicator 157 and the display device 170, are illuminated. The illumination program may contain illumination profiles for each of the light sources in the computer system 150, as for example light sources 166A, 166B and 172. The illumination profiles generally contain information or tables that describe how the light sources change in accordance with some event. For example, the illumination profiles may describe the relationship between the light output and the ambient light level, i.e., for a measured ambient light level, the light intensity of the light source should be set at a particular level. This information may be used in the illumination program to control the light sources based on a particular level of ambient light. The ambient light level may be the measured light level as for example, the level measured by the light sensors 164 or it may be some preset value. With regards to the later, the preset value may be some default value based on averages or it may be a value corresponding to a particular use, i.e., the user may set the value based on his/her location (e.g., lots of sunshine, inside a room using fluorescents and/or incandescent, complete or partial darkness, and the like).

In one implementation, the illumination profiles may be accessed by a user through a light control menu, which may be viewed on the display device 170 as part of a GUI interface. The light control menu may include light control settings pertaining to the illumination profiles. In fact, the light control menu may serve as a control panel for reviewing and/or customizing the light control settings, i.e., the user may quickly and conveniently review the light control settings and make changes thereto. Once changed, the modified light control settings will be automatically saved and thereby employed to handle future illumination processing.

Figure 2:
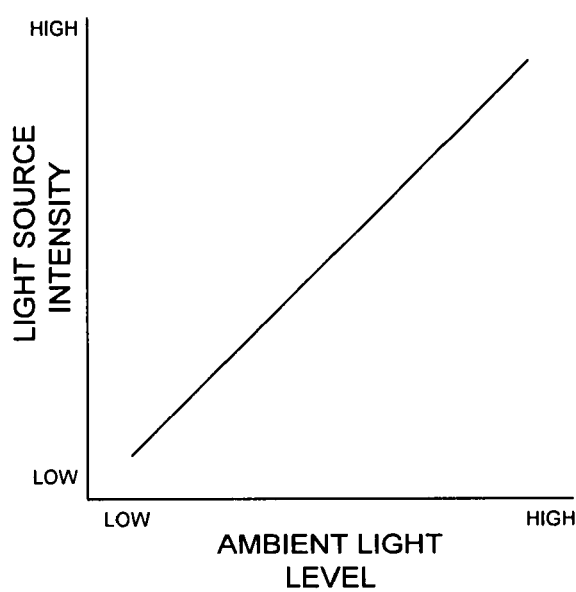
FIG. 2 is graphical representation showing light intensity versus ambient light level, in accordance with several embodiments of the present invention.
Figure 4:
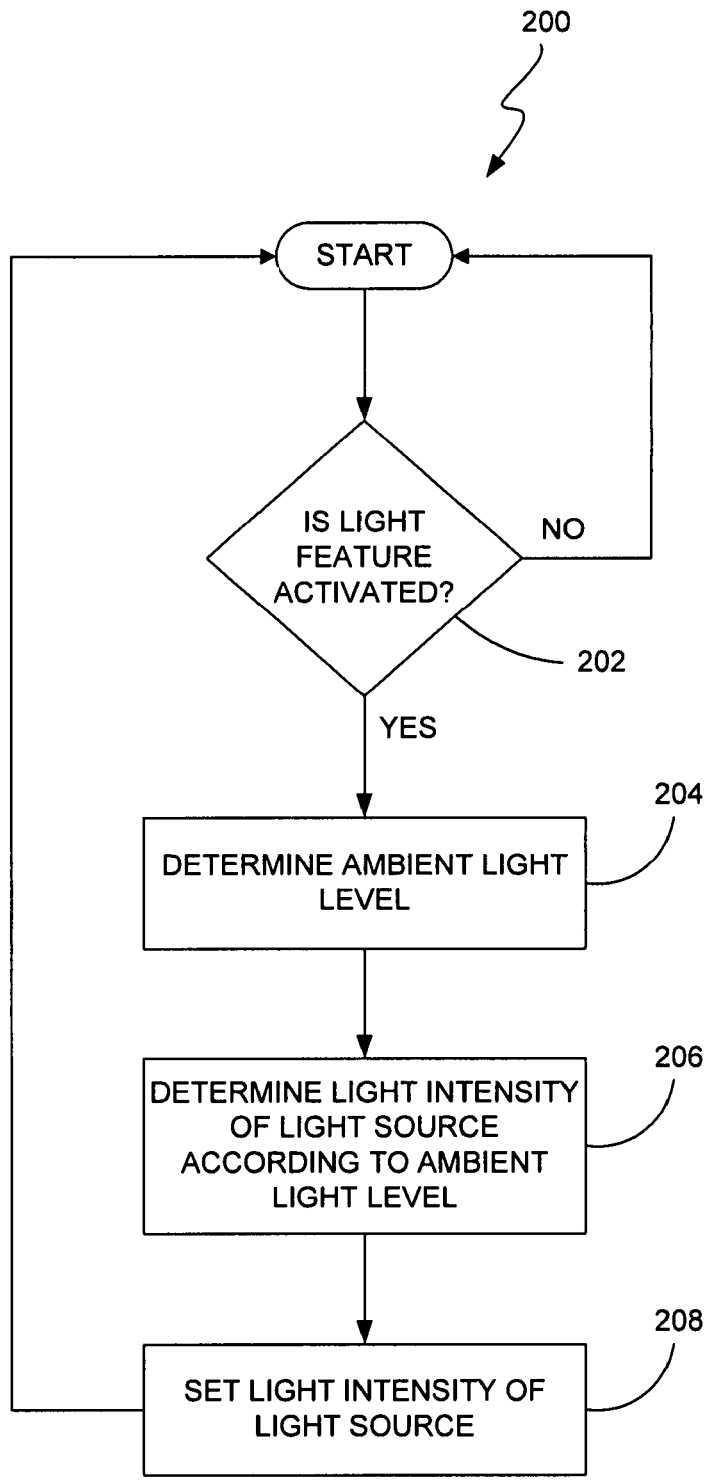
FIG. 4 is a flow diagram of illumination processing, in accordance with one embodiment of the present invention.

FIG. 4 is a flow diagram of illumination processing 200, in accordance with one embodiment of the present invention. By way of example, illumination processing may be implemented in the computer system of FIG. 2. Illumination processing generally begins at block 202 where a determination is made as to whether or not a light feature associated with a light source is activated. The light feature is generally concerned with how the various light sources of a computer system, as for example, the keyboard lights 166A, the indicator lights 166B and the display device 172 of FIG. 2, are illuminated. If the light feature is not activated, then the process flow ends.

If the light feature is activated, then the process flow proceeds to block 204 where the ambient light level is determined. The ambient light level is an indication of the degree of light to be utilized with illumination processing. In one embodiment, the ambient light level is determined by monitoring the output from one or more light sensors, as for example light sensors 164 in FIG. 2. In another embodiment, the ambient light level is determined by referring to user settings. For example, a user may enter information about the ambient light level (e.g., working inside, working outside, working in a dark room, working in a well lit room, etc.). The information may be initiated at start up by the computer system, as for example via a pop up window, or it may be user initiated via a GUI window that is opened by the user.

Following block 204, the process flow proceeds to block 206 where the light intensity of the light source is determined based on the ambient light level. This may be accomplished with a formula, a data table or the like. For example, the light intensity may be calculated using a formula, which includes the ambient light level as a variable. Additionally, the light intensity may be determined using data tables that show a relationship between the ambient light level and the intensity of the outputted light, i.e., once the ambient light level is determined, it can be used to look up the appropriate light intensity associated therewith. The data tables may be found experimentally or through simulation or modeling. The formulas and data tables themselves may be widely varied. For example, they may be preset or they may be modifiable.

Following block 206, the process flow proceeds to block 208 where the light intensity of the light source is set. For example, the power delivered to the light source may be adjusted to bring it the appropriate light intensity. After the light intensity has been set, the illumination processing is complete and ends. However, the illumination processing may be repeated at various intervals in case some input has changed, i.e., check to see if the light feature is still activated or if the data tables have been modified. By way of example, illumination processing may be repeated about 10 times a second, once every two seconds or somewhere therebetween.

The various aspects of the illumination processing described above can be used alone or in various combinations. The illumination processing is preferably implemented by a combination of hardware and software, but can also be implemented in hardware or software. The illumination processing can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, optical data storage devices, and carrier waves. The computer readable medium can also be distributed over a network coupled computer systems so that the computer readable code is stored and executed in a distributed fashion.

Figure 5:
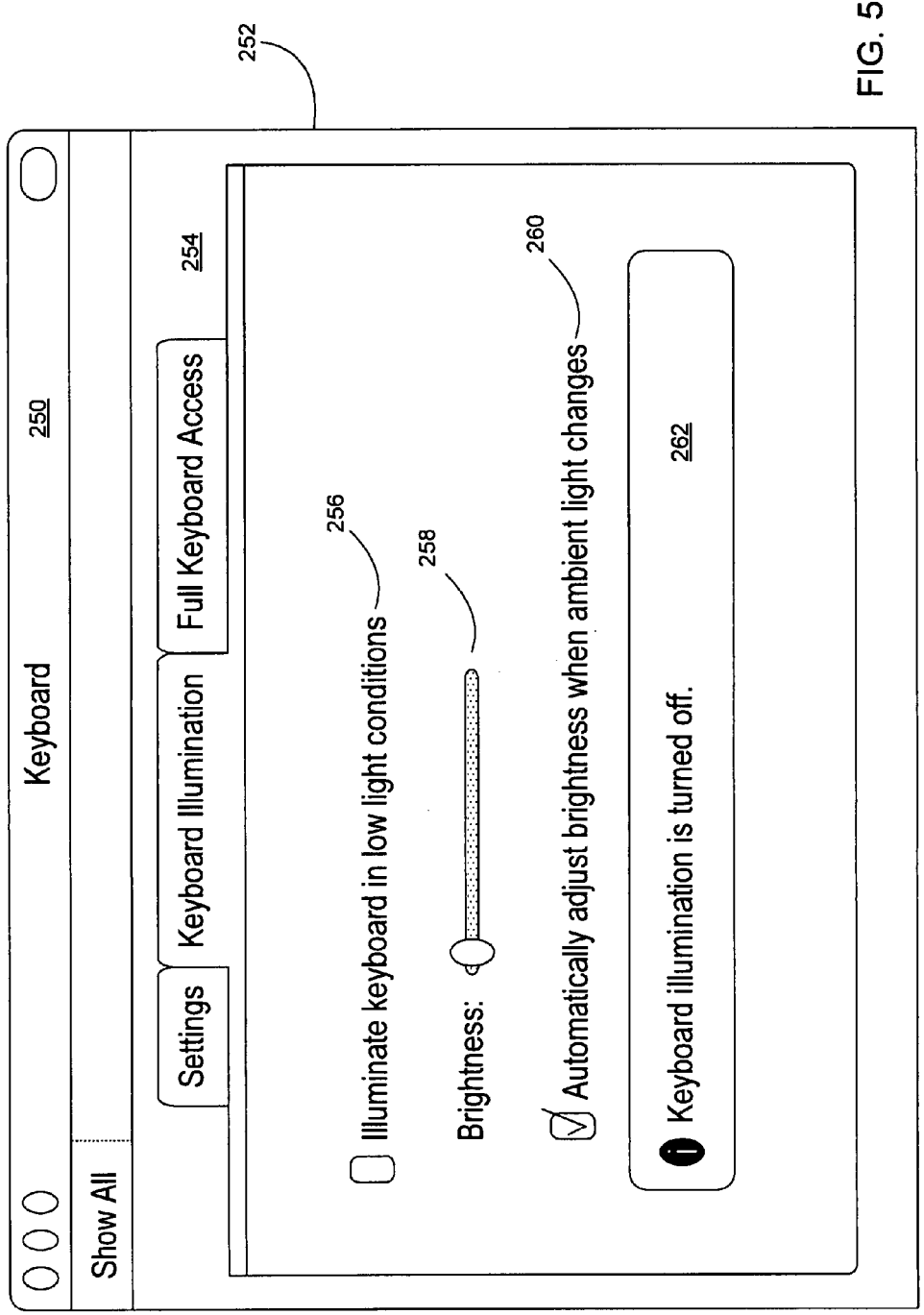
FIG. 5 is a diagram of a graphical user interface (GUI), in accordance with one embodiment of the present invention.

FIG. 5 is a diagram of a graphical user interface 250 (GUI), in accordance with one embodiment of the present invention. The GUI 250 represents the visual display panel for displaying the light profiles of one or more light sources on a computer display screen. Through the GUI 250, the user may quickly and conveniently review the light settings associated with the light source(s) and make changes thereto. The GUI 250 serves as a control panel for reviewing and/or customizing the light options associated with the various light sources.

As shown, the GUI 250 includes a window frame 252 that defines a window or field 254 having contents contained therein. The contents may be widely varied. The contents may include one or more on screen options, switches, labels, warnings and the like. In the illustrated embodiment, the GUI is dedicated to keyboard illumination and thus the field 254 includes an illumination option 256, a light adjustment slider 258, and an ambient light adjustment option 260. The illumination option 256, if it is enabled, instructs a computer system to illuminate the light source when the ambient light level is low. (Sometimes the keyboard does not have to be lit). The light adjustment slider 258, on the other hand, gives the user the ability to designate the desired brightness of the illumination provided by the light source. For example, by moving the slider, the user may increase or decrease the level of brightness. Furthermore, the ambient light adjustment option 260, if it is enabled, allows the computer system to automatically adjust the light intensity of the light source based on the ambient light levels. Additionally, a visual indication such as warning window 262 or check mark 264 may be used to inform the user as to which options are selected.

It should be noted that the GUI configuration shown in FIG. 5 is not a limitation and that the configuration may vary according to the specific needs of each light source. For example, each light source may have different light requirements (e.g., colors, durations, etc.) and therefore the GUI may need to be modified.

Figure 6A:
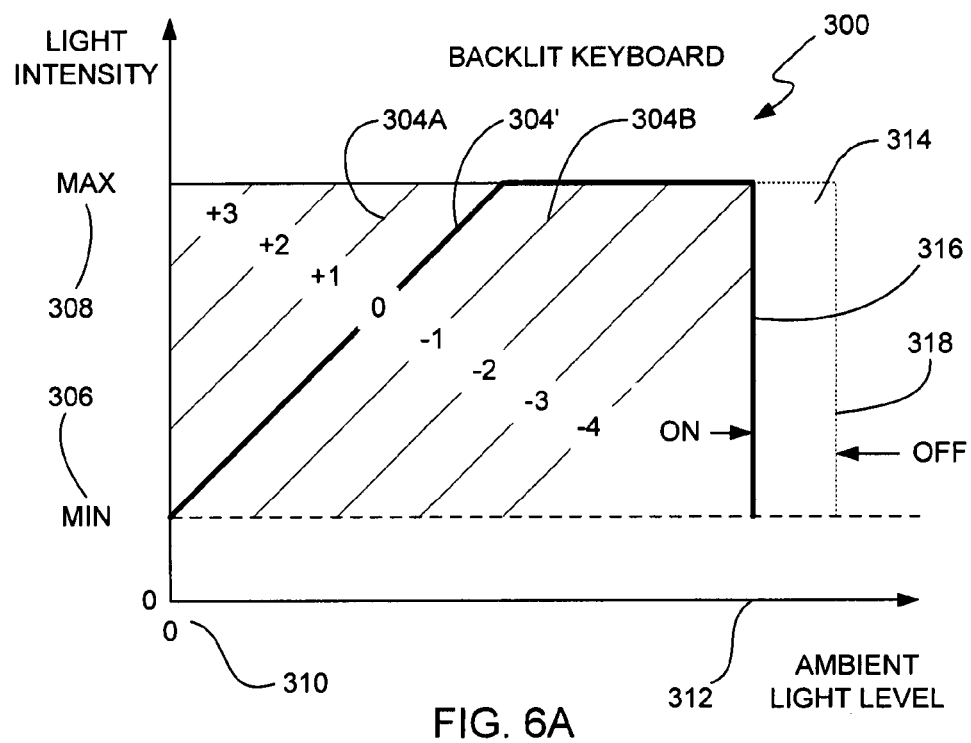
FIGS. 6A-C are graphical representations showing light intensity versus ambient light level, in accordance with several embodiments of the present invention.
Figure 6B:
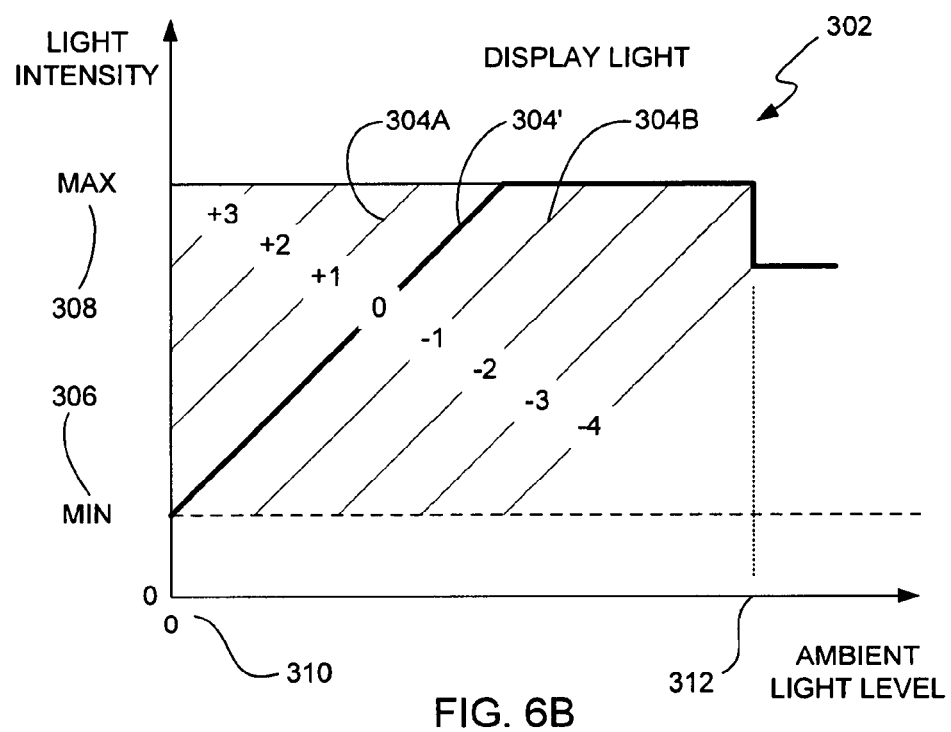

FIGS. 6A and 6B are light distribution plots 300 and 302, respectively, that may be used to control the light intensity of a light source associated with a component of a computer system, in accordance with one embodiment of the invention. By way of example, the light distribution plots 300 and 302 may correspond to the data tables or formulas described in FIG. 3. In FIG. 6A, the light distribution plot 300 is used to control the light intensity of a light source associated with a keyboard. In FIG. 6B, the light distribution plot 302 is used to control the light intensity of a light source associated with a display (LCD). In both Figures, the light distribution plots 300 and 302 illustrate curves 304 showing light intensity as a function of ambient light level. The light intensity is on the vertical axis and ambient light level is on the horizontal axis. Referring first to the vertical axis, each of the curves 304 starts at a minimum light intensity 306 (shown by the dotted line) or greater and extends to a maximum light intensity 308. The minimum light intensity 306 generally corresponds to the minimum amount of light needed for viewing and the maximum light intensity 308 generally corresponds to the maximum amount of light that may be produced.

In a similar manner and referring to the horizontal axis, each of the curves 304 also starts at a minimum ambient light level 310 or greater and extends to a maximum ambient light level 312. The minimum ambient light level 310 generally corresponds to complete darkness. The maximum ambient light level 312, on the other hand, may correspond to many things including the saturation point of the light sensors or the point where light is needed for viewing. For example, in FIG. 6A, the maximum ambient light level 312 may correspond to the point where backlighting is needed to help a user view the keys of the keyboard, i.e., when the ambient light gets low (darker). By way of example, the maximum ambient light level for backlighting may be between 0 and 10 lux, and more particularly about 5 to about 10 lux. In order to prevent the backlighting from going on and off at a particular ambient level, a hysteresis loop 314 may be provided. The hysteresis loop 314 includes an activation point 316 and a deactivation point 318. The deactivation point 318 represents the point where the backlighting is turned off and the activation point 316 represents the point where the backlighting is turned on. In FIG. 6B, the maximum ambient light level 312 may correspond to the saturation point of the light sensors, i.e., at its capacity. By way of example, the maximum ambient light level for the display may be about 1000 lux. When each of the curves reaches this point they level off and maintain a constant light intensity even if the ambient light level is higher.

Referring back to both Figures, each curve 304 represents a different level of brightness. In most cases, a default curve 304' (shown in bold) is present somewhere in between the other curves. The default curve 304 represents the most likely curve for all conditions and users. The curves 304A located above the default curve 304 represent higher brightness levels to varying degrees and the curves 304B below the default curve 304 represent lower brightness values to varying degrees. For ease of discussion, the different curves vary from 0 to +3 and from 0 to −4 brightness units in increments of 1. This, however, is not a requirement since the levels may extend to a greater number of positive or negative values. In most cases, the level of brightness is chosen by a user as for example using the GUI interface shown in FIG. 5. For example, a user may desire a greater amount of brightness thereby selecting the curves labeled +1, +2, or +3 or a user may desire a lesser amount of brightness thereby selecting the curves labeled −1, −2, −3 or −4.

Figure 6C:
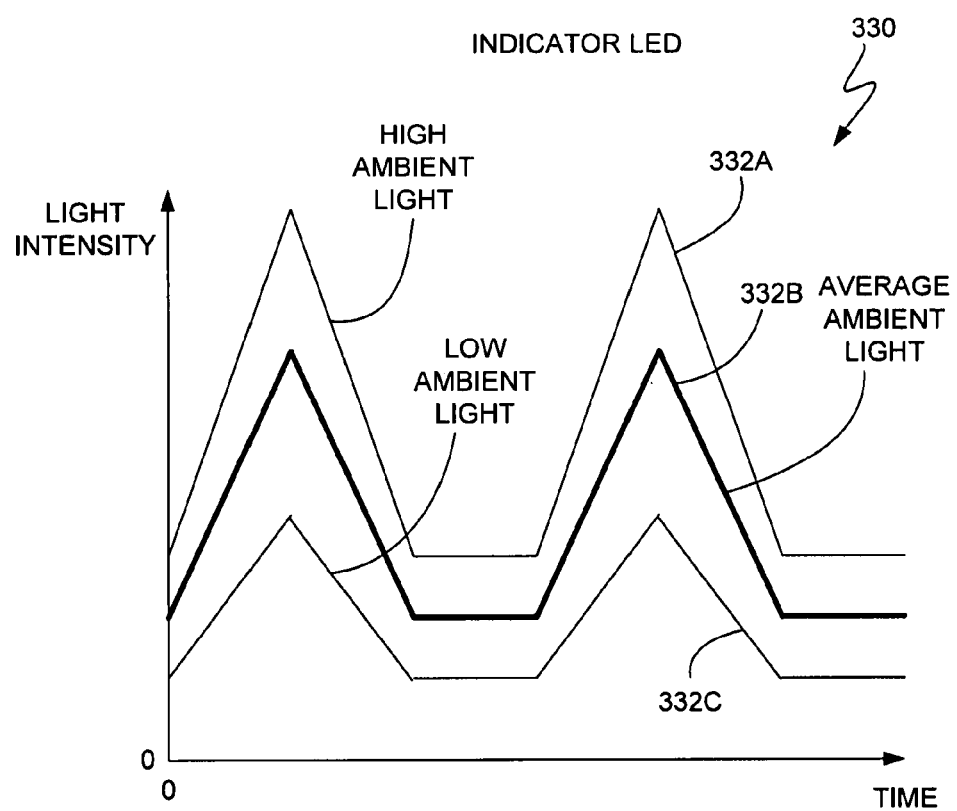

FIG. 6C is a light distribution plot 330 that may be used to control the light intensity of a light source associated with a sleep indicator, in accordance with one embodiment of the invention. By way of example, the light distribution plot 330 may correspond to the data tables or formulas described in FIG. 3. The light distribution plot 330 illustrates curves 332 showing light intensity as a function of time for varying levels of ambient light. The light intensity is on the vertical axis and the time is on the horizontal axis. As shown, the curves 332 follow a somewhat repeating waveform with peaks and troughs. As should be appreciated, the light intensity of sleep indicators is generally designed to fade in and out between a minimum and maximum value so as to indicate that the computer system is in a sleep mode. Each curve 332 represents a different level of ambient light. For ease of discussion, only three curves are shown (although many more curves can be used in actual practice). A first curve 332A is configured to represent a high ambient light level, a second curve 332B is configured to represent an average ambient light level, and a third curve 332C is configured to represent a low ambient light level. By way of example, the low ambient light level may correspond to about 0 to about 10 lux, the high ambient light level may correspond to about 1000 lux, and the average ambient light level is somewhere in between these two values.

With regards to FIGS. 6A-C, the curves themselves may be widely varied. For example, the slopes may be smaller or greater than shown. Furthermore, the curves may be curvilinear rather than rectilinear as shown. Moreover, it should be noted that maximum and minimum values, i.e., when the intensity is high or low or when the ambient light level is high and low, tend to vary according to the specific conditions in which the lights are used. For example, what is considered low ambient light with regards to the display may be different than what is considered low ambient light with regards to the indicator or keyboard (or vice versa).

Figure 7:
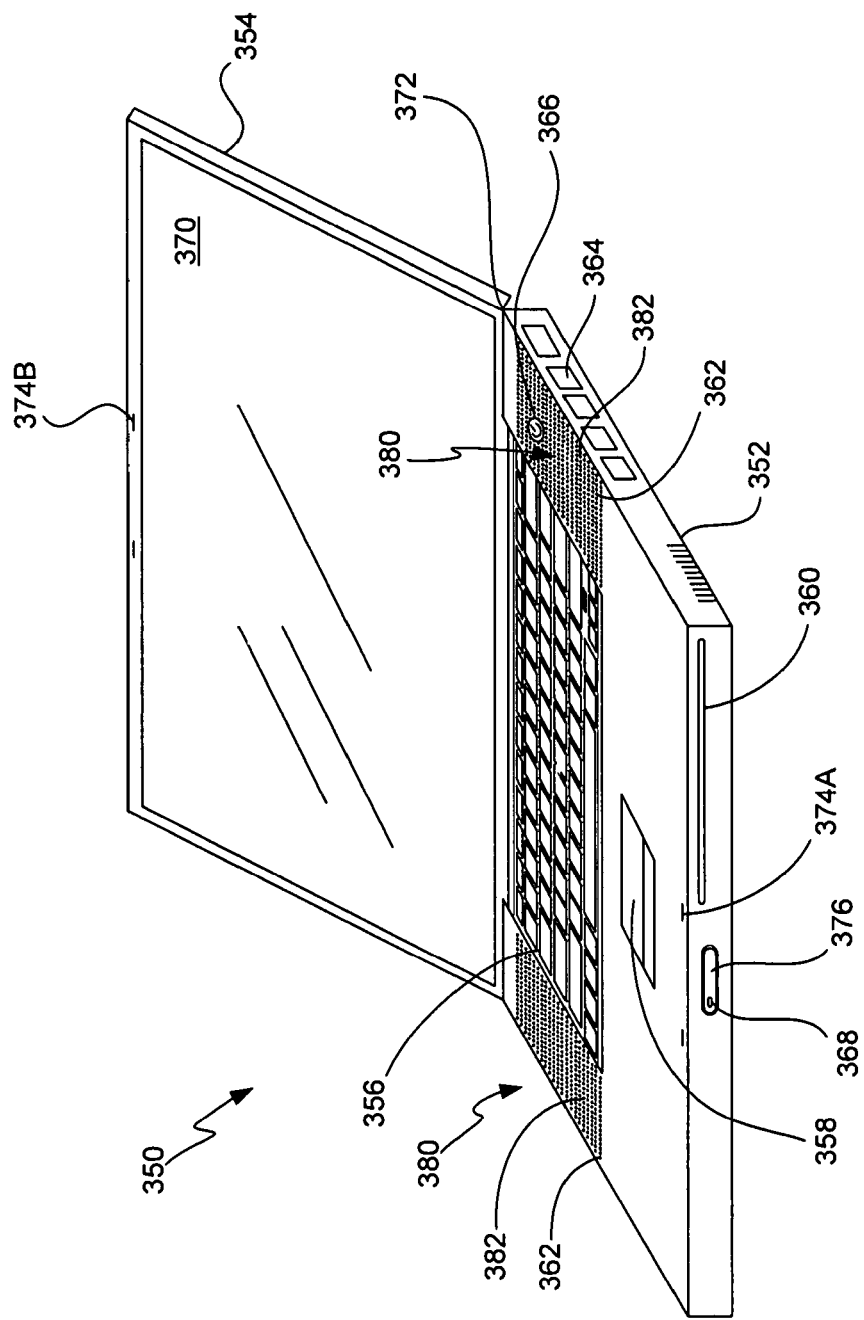
FIG. 7 is a perspective diagram of a portable computer, in accordance with one embodiment of the invention.

FIG. 7 is a perspective diagram of a notebook computer 350, in accordance with one embodiment of the invention. By way of example, the notebook computer may correspond to the Powerbook manufactured by Apple Inc. of Cupertino, Calif. The notebook computer 350 generally includes a base 352 and a lid 354, each of which has a housing that contains various internal components. With regards to the base 352, the internal components may correspond to various integrated circuit chips and other circuitry that provide computing operations for the notebook computer 350. By way of example, the integrated circuit chips and other circuitry may include processors, controllers, bridges, memory, circuit boards and the like. The internal components can also take on other forms as for example hard drives, fans, batteries, and the like. The base 352 may also include various I/O devices as for example a back lit keyboard 356, track pad 358, disk drive 360, speakers 362 and the like. The keyboard may be a removable keyboard such as the keyboard described in U.S. Pat. No. 6,212,066, titled, "PORTABLE COMPUTER WITH REMOVABLE KEYBOARD," issued Apr. 3, 2001, or U.S. patent application Ser. No. 09/755,625, titled, "KEYBOARD ARRANGEMENT," filed Jan. 4, 2001 and that has issued as U.S. Pat. No. 6,510,048, both of which are herein incorporated by reference. The base 352 may also include other circuitry including connectors 364, buttons 366, and indicators 368. The lid 354, on the other hand, typically contains a liquid crystal display (LCD) 370.

In most cases, the lid 354 is pivotally coupled to the base 352 via a hinge mechanism 372. As such, the lid 354 may rotate into an open position (as shown) or a closed position (not shown) relative to the base 352. As should be appreciated, the LCD display 370 is visible to a user of the notebook computer 350 when the lid 354 is in the open position and no longer visible to the user when the lid 354 is in a closed position. The notebook computer 350 may include a locking mechanism 374 for securing the lid 354 to the base 352 when the lid 354 is in the closed position. The locking mechanism 374 generally consists of two parts, a base side locking mechanism 374A and a lid side locking mechanism 374B. The base side locking mechanism 374A and the lid side locking mechanism 374B are cooperatively positioned so that when the lid 354 is closed, the locking mechanisms 374 lockably engage with one another thus securing the lid 354 to the base 352. The locking mechanism 374 also includes a knob, switch or button 376 for releasing the base side locking mechanism 374A from the lid side locking mechanism 374B so as to allow the lid 354 to be opened. In the illustrated embodiment, the indicator 368 is disposed in the button 376. By way of example, the indicator 368 may be a sleep indicator that informs the user when the portable computer is in a sleep mode. An example of a locking mechanism that may be used can be found in U.S. patent application Ser. No. 09/755,622, titled, "LOCKING SYSTEM FOR A PORTABLE COMPUTER," filed Jan. 5, 2001 and that has issued as U.S. Pat. No. 6,659,516, which is herein incorporated by reference.

In one embodiment, the notebook computer 350 includes a light adjustment circuit for adjusting the intensity of light outputted from the notebook computer 350. By adjusting the light intensity, the power consumption of the notebook computer 350 can be reduced thereby increasing battery life. By way of example, the light adjustment circuit may correspond to the circuit described in FIG. 2.

The light adjustment circuit generally contains various light sources configured to emit light as well as one or more light sensors configured to measure the light level of the ambient light that surrounds the notebook computer 350 during use. The configuration of the light sources and sensors of the light adjustment circuit may be widely varied. For example, the light sources and light sensors may be positioned almost anywhere on the notebook computer 350 (e.g., base or lid). Furthermore, the light sources and light sensors may be located at peripheral locations around the notebook computer (e.g., exposed) or they may be located at internal locations within the notebook computer. In the later case, windows and light conduits may be used to transmit ambient light into the portable computer or output light out of the notebook computer.

In one implementation, the ambient light receiving means whether a light sensor, a window or a light conduit, is located on the mating surfaces of the base or lid. By mating surfaces, it is generally meant the surfaces that mate when the notebook computer 350 is closed, as for example, the surfaces that include the LCD 370 and keyboard 356. When located on the mating surfaces, the portable computer 350 can sense when the lid 354 is closed (e.g., no ambient light) and thus when the notebook computer 350 is not in use. As a result, the notebook computer 350 can reduce the intensity of the light for each of the light sources thereby saving valuable battery life.

In the illustrated embodiment, the light adjustment circuit includes a first light source for lighting up the indicator 368 (e.g., LED), a second light source for lighting up the back lit keyboard 356 (e.g., LED) and a third light source for lighting up the LCD display 370 (e.g., light panel). In one particular embodiment, the backlit keyboard is configured to illuminate the legends disposed on the keyboard so that they glow when the light source is turned on. When turned off, the legends have a color that provides contrast with the rest of the key so that they are clearly visible when the light source is turned off (and the ambient light is high). In another embodiment, the backlit keyboard is configured to illuminate the area around the keys so as to define the edges of the keys. The light adjustment circuit also includes a pair of light sensors 380, each of which is disposed within the base 352 of the notebook computer 350, and more particularly behind a grill 382 of the speakers 362 disposed in the base 352. As shown, the grill 382, which includes a plurality of holes, is typically formed in the housing that forms the base 352. The holes act as a window or light conduit for transmitting ambient light to the light sensors 380 disposed within the base 382. As should be appreciated, the grill 382 is generally left exposed during use so as not to muffle the sound emanating therefrom and thus it is a good location for positioning the light sensors 380, i.e., typically not covered.

In one particular embodiment, the keyboard light comes on in low ambient light, thereafter adjusts to the ambient light level and then automatically shuts off in brighter ambient light, i.e., the legend glows in dark conditions and reverts to its natural color in lighted conditions.

Figure 8:
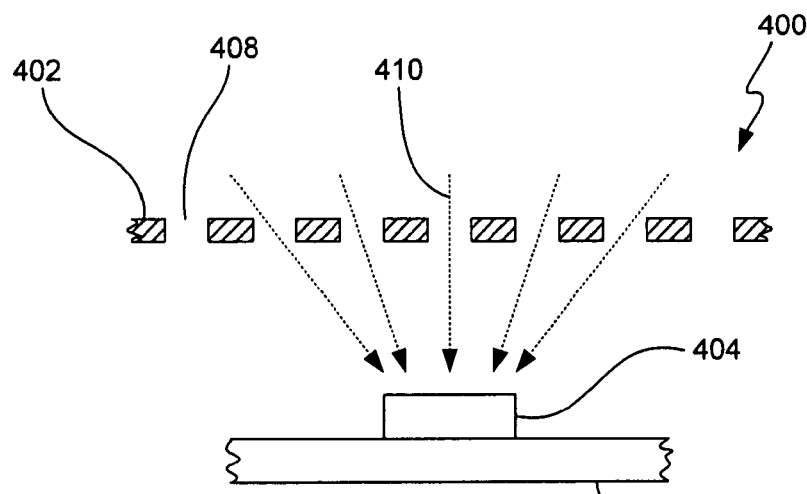
FIG. 8 is a side elevation view, in cross section, of a portable computer, in accordance with one embodiment of the present invention.

FIG. 8 is a side elevation view, in cross section, of a portable computer 400, in accordance with one embodiment of the present invention. By way of example, the portable computer 400 may correspond to the notebook computer shown in FIG. 7. The portable computer 400 includes a housing 402 for enclosing a light sensor 404 that is attached to a printed circuit board 406. The light sensor 404 may be attached to the printed circuit board 406 using any suitable and conventional means. By way of example, the printed circuit board 406 may correspond to the mother board of the portable computer 400. As shown, the housing 402 includes a plurality of openings 408. The openings 408 are preferable dimensioned to allow the passage of ambient light 410 so that the light sensor 404 can measure the intensity of the ambient light 410. By way of example, the openings 408 may form the grill of a speaker. In one particular implementation, the openings 408 have a diameter of about 0.8 mm, and spacings therebetween of about 0.8 mm. Furthermore, the light sensor 404 generally represents a photodiode as for example, the photodiode BS520 manufactured by Sharp Microelectronics of America.

Figure 9:
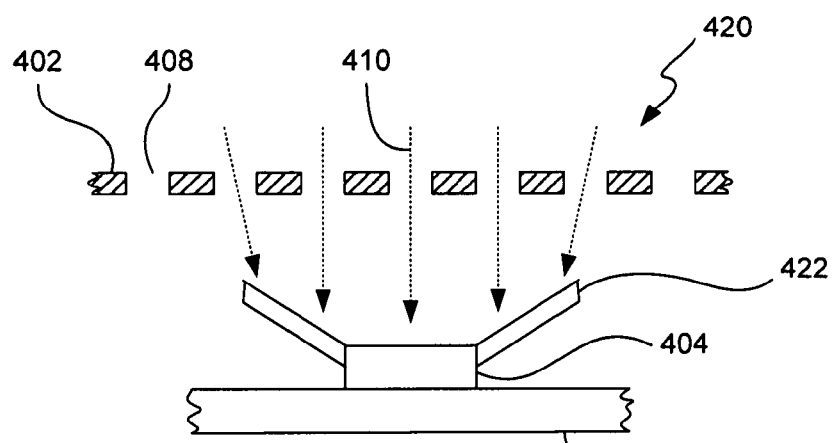
FIG. 9 is a side elevation view, in cross section, of a portable computer, in accordance with an alternate embodiment of the present invention.

FIG. 9 is a side elevation view, in cross section, of a portable computer 420, in accordance with an alternate embodiment of the present invention. The portable computer 420 is like the portable computer 400 shown in FIG. 7, however unlike the portable computer 400 shown in FIG. 7, the portable computer 420 includes a light guide 422 configured to focus the ambient light 410 onto the light sensor 404. The light guide 422 is configured to receive the light 410 passing through the openings 408 and to direct the light 410 to the light sensor 404. The light incident on the light sensor 404 is thus more intense than would otherwise be achievable without the light guide 422.

Figure 10:
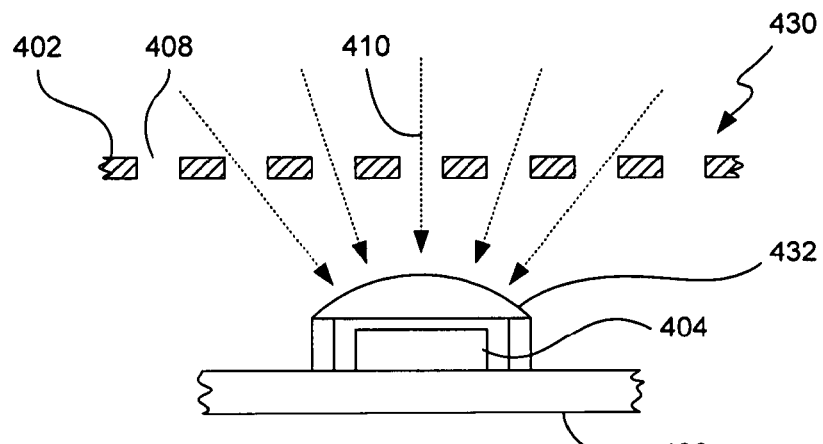
FIG. 10 is a side elevation view, in cross section, of a portable computer, in accordance with an alternate embodiment of the present invention.

FIG. 10 is a side elevation view, in cross section, of a portable computer 430, in accordance with an alternate embodiment of the present invention. The portable computer 430 is like the portable computer 400 shown in FIG. 7, however unlike the portable computer 400 shown in FIG. 7, the portable computer 430 includes a lens 432 configured to focus the ambient light 410 onto the light sensor 404. The lens 432 is configured to receive the ambient light 410 passing through the openings 408 and to direct it to the light sensor 404. The light incident on the light sensor 404 is thus more intense than would otherwise be achievable without the lens 432.

Figure 11:
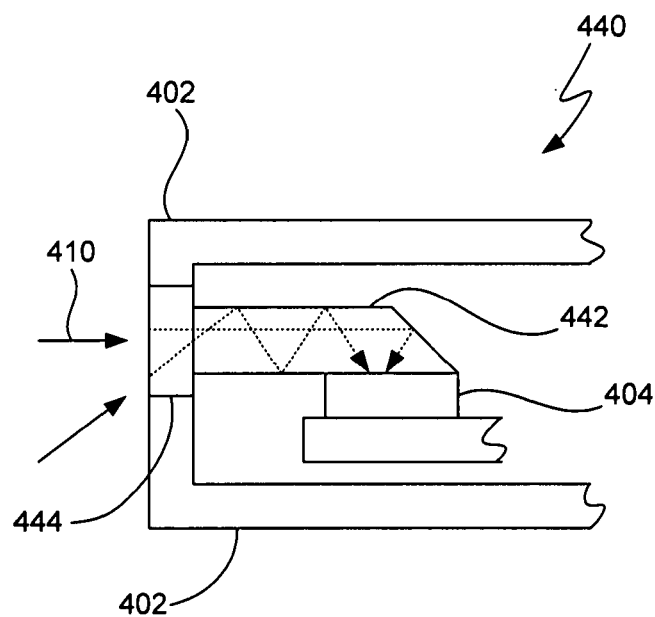
FIG. 11 is a side elevation view, in cross section, of a portable computer, in accordance with an alternate embodiment of the present invention.

FIG. 11 is a side elevation view, in cross section, of a portable computer 440, in accordance with an alternate embodiment of the present invention. By way of example, the portable computer 400 may correspond to the notebook computer shown in FIG. 7. In this particular embodiment, a light pipe 442 is configured to direct ambient light 410 from outside the housing 402 to inside the housing 402 towards the light sensor 404. The light pipe 442 may be integrally formed with a window 444 located in a wall of the housing 402 or it may be a separate component. In the later case, the light pipe 442 may be configured to contact at least a portion of the window 444 or may include a gap therebetween. In a similar vein, the light pipe 442 may be configured to contact at least a portion of the light sensor 404 or may include a gap therebetween. Furthermore, the light pipe 442 may be structurally coupled to the housing 402 or it may be structurally coupled to the light sensor 404 or to the circuit board 406 to which the light sensor 404 is attached. As should be appreciated, the material that forms the light pipe 442 must be suitable to facilitate the transmission of light therethrough. In some implementations, the material corresponds certain types of plastics or other translucent materials.

Figure 12:
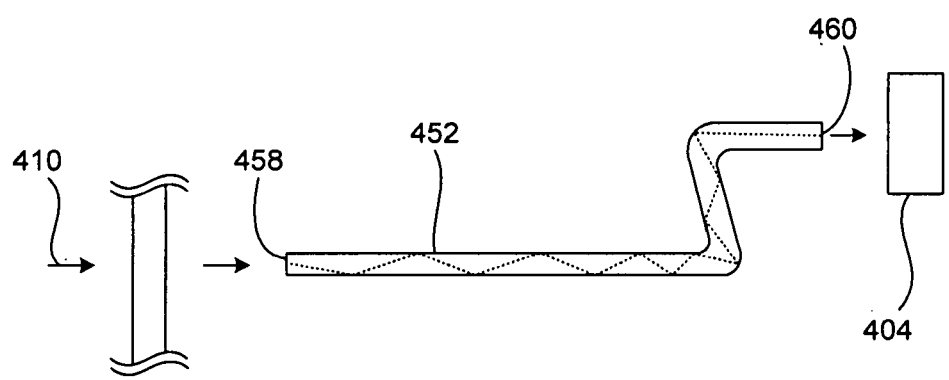
FIG. 12 is a side elevation view, in cross section, of a portable computer, in accordance with an alternate embodiment of the present invention.

FIG. 12 is a side elevation view, in cross section, of a portable computer 450, in accordance with an alternate embodiment of the present invention. The portable computer 450 is like the portable computer 440 shown in FIG. 11, however unlike the portable computer 440 shown in FIG. 10, the portable computer 450 includes one or more flexible light pipes 452 configured to distribute light ambient light 410 to the light sensor 404. Flexible light pipes typically allow a wider range of light sensor positions. For example, the light pipe 452 may be used to distribute the ambient light 410 to the light sensor 404 by bending around components disposed therebetween (e.g., walls, frames, I/O devices and the like). The light pipe 452 generally includes a transmissive portion at its interior and a reflective portion at its exterior. Because the exterior of the light pipe 452 is reflective (due to total internal reflection), the light 410 reflects off the sides of the pipe 452 as it travels through the interior of the light pipe 452. Accordingly, when light 410 is made incident on an inner edge 458 of the light pipe 452 it is directed through the light pipe 452 via the transmissive and reflective portions to an outer edge 460 of the light pipe 452 where it emits the light 410 to another location positioned away from the location of the original ambient light 410.

Figure 13:
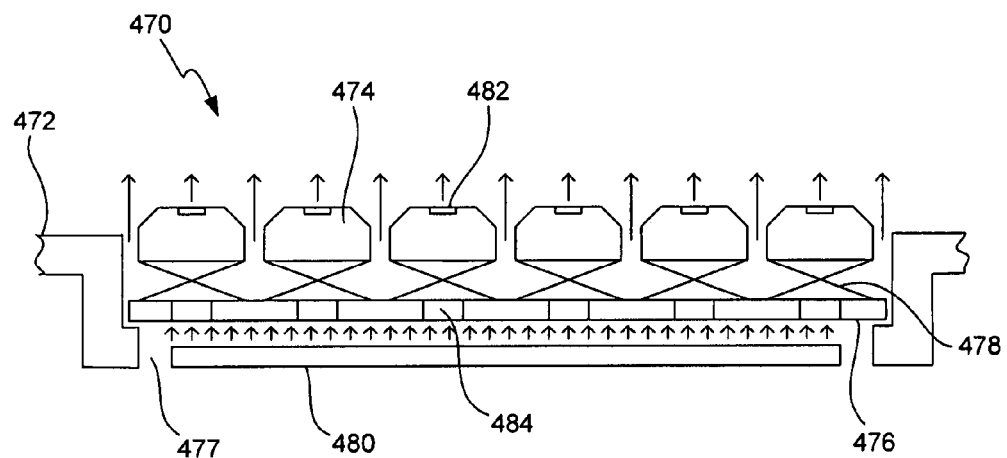
FIG. 13 is a side elevation view, in cross section, of a back lit keyboard, in accordance with one embodiment of the present invention.

FIG. 13 is a side elevation view, in cross section, of a back lit keyboard 470, in accordance with one embodiment of the present invention. By way of example, the back lit keyboard 470 may generally correspond to the back lit keyboard shown in FIG. 7. The keyboard 470 is configured to allow a user to input commands and other instructions to a portable computer 472. For example, the keyboard 470 may allow a user of the portable computer 472 to enter alphanumeric data or to execute tasks such as GUI selections. As shown, the keyboard 470 includes a plurality of keys 474 that are attached to a base plate 476. The keys 474 may be attached using any suitable arrangement. In the illustrated embodiment, the keys 474 are attached via a linkage 478 that allows the keys 474 to move up and down relative to the base plate 476. By way of example, the linkage 478 may be a scissor mechanism. Although not shown, the base plate 476 generally includes a circuit layer that sends a signal to the portable computer 472 when a particular key 474 is pressed down. The base plate 476 may also include a spring element (not shown) for biasing the keys 474 in the up position. Furthermore, the keyboard 470 is positioned within an opening 477 of a base 478 of the portable computer 472. The keyboard 470 may be held within the opening 477 using any suitable means (e.g., screws, bolts, etc.). In one embodiment, the keyboard 470 is removable so latches, hooks, snaps, magnets, and the like may be used to hold the keyboard 470 relative to the base 478.

As shown, a light source 480 is disposed underneath the base plate 476. The light source 480 is configured to provide light to the keyboard 470 so that the keyboard 470 can be illuminated. The illumination may be widely varied. The illumination may be provided in the space between the keys 474 so as to better define the edge of keys 474. Alternatively or additionally, the illumination may be provided through the keys 474 so as to better define the keys 474. In one embodiment, the legend 482 (e.g., letter or symbol) disposed on the keys 474 is illuminated rather than the entire key 474. The base plate 476 is generally configured with one or more openings 484 so as to deliver the light from the light source 480 to the keys 474. In essence, the openings 484 allow light emanating from the light source 480 to travel to and/or around the keys 474, i.e., the light that passes through the opening 484 may be used to illuminate the space between the keys 474 and/or the keys 474 themselves.

Alternatively or additionally, the base plate or portions thereof may be formed from a translucent material thereby allowing the light to be transmitted therethrough. The light source may be widely varied. For example, the light source may be one or more light panels, a plurality of spaced apart light sources, and the like that directs light towards the backside of the base plate. In the illustrated embodiment, the light source 480 corresponds to a light panel that distributes light over an area. For example, it may be configured to distribute light towards the entire backside of the base plate 476 or it may distribute light to only a portion of the base plate 476. Moreover, the light source 480 may be configured to contact at least a portion of the base plate 476 or it may include a gap therebetween (as shown).

Figure 14:
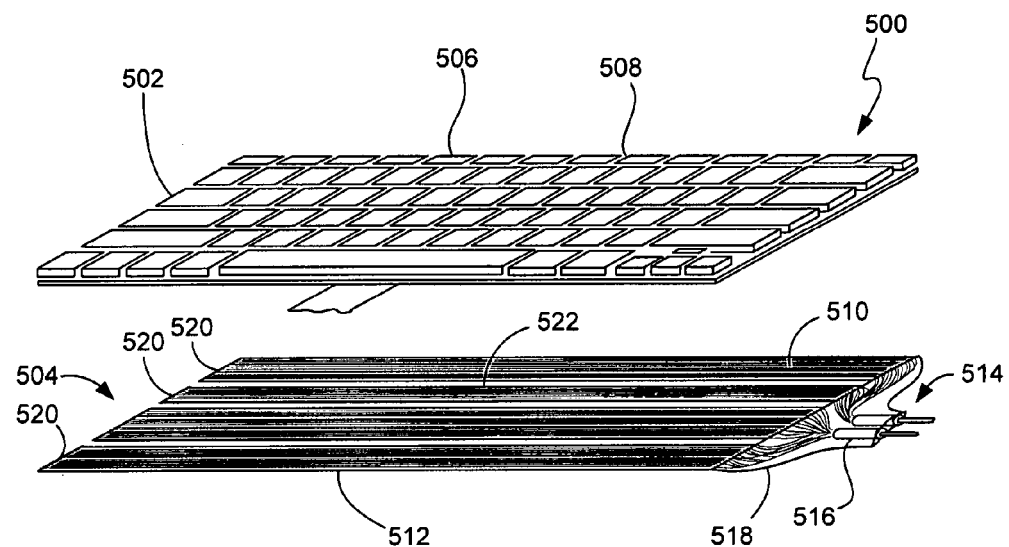
FIG. 14 is an exploded perspective view of a back lit keyboard, in accordance with one embodiment of the present invention.

FIG. 14 is an exploded perspective view of a back lit keyboard 500, in accordance with one embodiment of the present invention. By way of example, the back lit keyboard 500 may generally correspond to the keyboard shown in FIG. 13. In this particular embodiment, the back lit keyboard 500 consists of a keyboard 502 and a light panel 504. The keyboard 502 is configured to transmit light from the backside of the keyboard 502 where the light panel 504 is located to the opposite side where the keys 506 of the keyboard 502 are located. In one embodiment, the legends located on the keys 506 as well as the spaces located between the keys 506 are illuminated. As such, the keyboard 500 includes a path for distributing the light to the keys 506 as well as to the spaces 508 between the keys 506.

As shown, the light panel 504 includes a plurality of optical fibers 510. The optical fibers 510 are generally configured to allow light passing therethrough to escape through the outer surface of the optical fiber 510. By way of example, the optical fibers may be scored at various locations along the length so that the light leaks out of the optical fiber. Furthermore, the optical fibers 510 are positioned adjacent one another in rows so as to form a sheet of optical fibers. The optical fibers 510 thus distribute light in a planar manner. In some cases, the optical fibers 510 are attached to a backing sheet 512 to help hold them together. The backing sheet 512 may also help direct the light in direction of the keyboard 502, i.e., it may be a reflective surface that helps direct the light to one side of the light panel 504. Furthermore, each of the optical fibers 510 are optically coupled to a light source 514. For example, the ends of the optical fibers 510 may be positioned adjacent a light source 514 so that the light emanating from the light source 514 passes therethrough. By way of example, the light source may correspond to a light emitting diode (LED). In the illustrated embodiment, each of the optical fibers 510 extends into a light housing 516 that contains the light source 514. The light housings 516 provide a means for connecting the ends of the optical fibers 510 proximate the light source 514 and they may help direct light from the light source 514 into the optical fibers 510. In some cases, a cover 518 may be provided to protect the proximal portions of the optical fibers 510 as well as the light housing/light sources 514/516. By way of example, the light panel described above may be manufactured by Poly-Optical of Irvine, Calif.

The configuration of the light panel 504 may be widely varied. In the illustrated embodiment, the light panel 504 is broken up into a plurality of strands 520, each of which includes a plurality of optical fibers 510. The optical fibers 510 from each strand may extend into a single light housing/light source 514/516 or they may extend into multiple light housing/light sources 514/516 (as shown). Each of the strands 520 is separated by a gap 522. The gap 522 may allow space for fibers and other components that need to pass through the light panel 504. The multiple edges of the strands 520 may also be used to help secure the light panel 504 to the back of the keyboard 502. For example, the edges may be secured to the backside of the keyboard 502 with screws that trap the edge of the strands 520 between the screw and the backside of the keyboard 502. The number of strands 520 may be widely varied. In one embodiment, the number of strands corresponds to the number of rows of keys on the keyboard 502, i.e., for every row of keys there is a corresponding strand. This, however, is not a requirement as the number of strands may depend on other factors.

The light source 514 may be configured to distribute white or colored light. In some circumstances, the light source 514 itself is capable of producing different colors and in other cases different colored light sources 514 may be optically coupled to different optical fibers 510 from each strand 520 so that the color of light emanating from each strand 520 can be controlled. By way of example, the light panel 504 may be configured to change its color in a manner similar to that which is disclosed in. U.S. patent application Ser. No. 10/075,964, titled, "ACTIVE ENCLOSURE FOR COMPUTING DEVICE," filed Feb. 13, 2002 and published as Publication No. 2003/0002246, and U.S. patent application Ser. No. 10/075,520, titled, "COMPUTING DEVICE WITH DYNAMIC ORNAMENTAL APPEARANCE," filed Feb. 13, 2002 and issued as U.S. Pat. No. 7,113,196, both of which are herein incorporated by reference.

Figure 15:
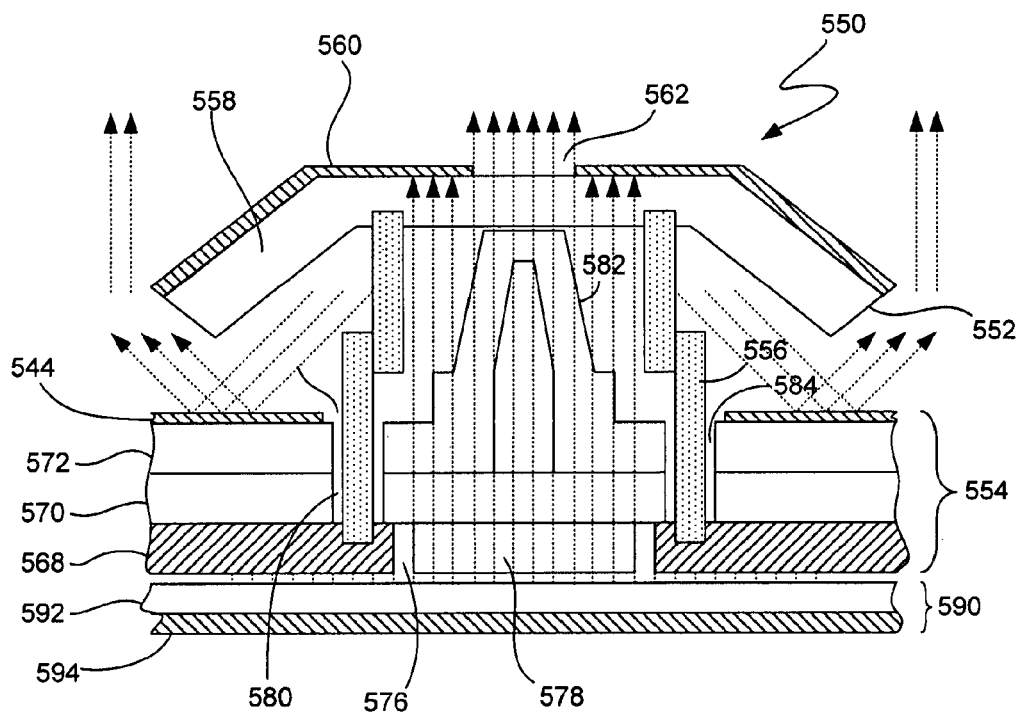
FIG. 15 is a broken away side elevation view, in cross section, of a back lit keyboard, in accordance with one embodiment of the present invention.

FIG. 15 is a broken away side elevation view, in cross section, of a back lit keyboard 550, in accordance with one embodiment of the present invention. By way of example, the back lit keyboard 550 may generally correspond to the back lit keyboard shown in FIG. 13. The back lit keyboard 550 generally includes a plurality of keys 552, each of which is movably mounted to a base plate 554 via a scissor mechanism 556. The scissor mechanism 556 provides stability to the keys 552 while allowing the keys 552 to move up and down. The keys 552 and the base plate 554 are both composed of various layers. The keys 552 include a translucent base layer 558 and an opaque mask layer 560. The base layer 558 is configured to allow the passage of light therethrough. The mask layer 560, on the other hand, is configured to cover the base layer 558 except at an opening 562. Light is therefore allowed to pass through the base layer 558 and out the opening 562 in the mask layer 560. The opening 562 generally defines a legend on the keys 552. By way of example, the legend may correspond to letters, symbols and the like. The base layer 558 and the mask layer 560 may be widely varied. In one embodiment, the mask layer 560 is painted (e.g., primer and color coat) on the base layer 558, which is formed from clear or translucent plastic, and then the mask layer 560 is laser etched to form the opening 562. In some cases, the base layer 558 is also etched so as to produce a frosted surface. The frosted surface produces a uniform glow when the keys 552 are illuminated with light.

The base plate 554 includes a feature plate 568, a switch membrane 570, a rubber dome sheet 572 and a mask layer 574. The feature plate 568 is configured to support the various layers of the keyboard 550 in their assembled position. The feature plate 568 includes an opening 576 underneath each of the keys 552. The openings 576 provide an area where light may pass so as to illuminate the rest of the keyboard 500. The base plate 554 may include a transparent disk 578 disposed in the opening 576 of the feature plate 568. The transparent disk 578 is attached to the back of the switch membrane 570 and may be trapped between portions of the feature plate 568 and the switch membrane 570. The transparent disk 578 is configured to provide rigidity at the opening 576 so as to prevent bowing in areas surrounding the opening 576 when the key 552 is pressed down while still allowing the passage of light. Although not shown in great detail, the scissor mechanism 556 is typically attached to the feature plate 568. The feature plate may be formed from sheet metal such as stainless steel.

The switch membrane 570, which is positioned over the feature plate 568, carries the circuit switches used to drive the signals when the keys 552 are pressed down. The switch membrane 570 generally includes a flexible and translucent sheet with a circuit pattern formed thereon. The translucency of the sheet is configured to allow the passage of light therethrough. The switch membrane 570 typically includes a through hole 580 for the scissor mechanism 556. In some cases, the switch membrane 570 may include a mask layer for preventing the passage of light therethrough although this is not a requirement.

The rubber dome sheet 572, which is positioned over the switch membrane 570, carries a plurality of rubber domes 582 that provide a biasing force to each of the keys 552, i.e., they bias the keys upward. The user therefore must work against the biasing force (by pressing down on the key) in order to actuate the switch on the switch membrane 570. The rubber dome sheet 572 is also formed from a translucent material so that light may pass therethrough. Like the switch membrane, the rubber dome 572 sheet also includes a through hole 584 for the scissor mechanism 556.

The mask layer 574, which is positioned over the rubber dome sheet 572, covers the rubber dome sheet 572 except at an opening 586. Light is therefore allowed to pass through the other layers and out the opening 586 in the mask layer 574. In most cases, the mask layer 574 covers the areas of the base plate 554 between adjacent keys 552 thereby providing a uniform look between adjacent keys 552. In the illustrated embodiment, the mask layer 574 starts at a point underneath the key 552. The mask layer 574 may work with the mask layer of the switch membrane 570 to mask the desired portions of the base plate 554. In most cases, the mask layer 574 is printed on the surface of the rubber dome sheet 572. The mask layer 574 may be any color. In one particular implementation, the mask layer is gray.

The back lit keyboard 550 also includes a light panel 590. The light panel 590 is disposed underneath the base plate 554 so as to illuminate the keyboard 550. The light panel 590 may or may not be attached to the base plate 554. In the illustrated embodiment, the light panel 590 is attached as for example using screws or bolts. As discussed previously, the light panel 590 generally includes a plurality of optical fibers 592 and a backing sheet 594. The optical fibers 592 are typically formed from a clear material. In one implementation, one end of the optical fibers are connected to an LED and the opposite end is blocked. Moreover, the optical fibers are lined up in a sheet and scored (cut) so that light may leak therefrom, i.e., along the body of the fiber thread rather than only at its ends. By way of example, the optical fibers may have a diameter of about 0.1 inches. The optical fibers 592 are generally attached to the backing sheet 594 via an adhesive 596 such as glue. The backing sheet 594 helps to maintain the position of the optical fibers 592 and to direct the light emanating from the optical fibers 592 towards the back side of the base plate 554.

As shown in FIG. 15, the light panel 590 transmits light towards the back side of the feature plate 568. Light that intersects the feature plate 568 is blocked while light that intersects the opening 576 is allowed to continue on its path. The light traveling through the opening 576 in turn passes through the transparent disk 578, the switch membrane 570 and the rubber dome sheet 572. Thereafter, the light either intersects the mask layer 574 or the opening 586 in the mask layer 574. Like the feature plate 568, light that intersects the mask layer 574 is blocked while light that intersects the opening 586 is allowed to continue on its path. The light exiting the opening 586 in turn lights up the area between the keys 552 and the base plate 554. Some of the light illuminates the keys 552 and some of the light illuminates the area between adjacent keys 552. For example, some of the light passes through the base layer 558 of the key 552. This light either intersects the mask layer 560 or the opening 562 in the mask layer 560. The light that intersects the mask layer 560 is blocked while light that intersects the opening 562 is allowed to continue on its path. In most cases, the light exiting the opening 562 is diffused in some manner so as to produce a uniform glow at the top surface of the key 552. Some of the light also passes through the gap formed between the key 552 and the base plate 554. This light typically reflects off the top surface of the mask layer 574 thereby illuminating the area between adjacent keys 552.

Figure 16:
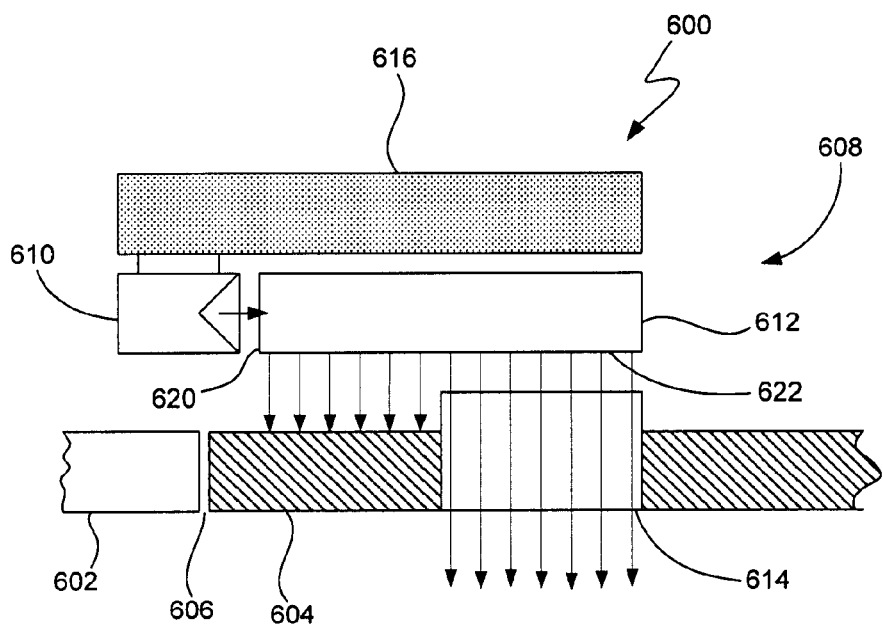
FIG. 16 is a top view, in cross section, of a portable computer, in accordance with one embodiment of the present invention.

FIG. 16 is a top view, in cross section, of a portable computer 600, in accordance with one embodiment of the present invention. By way of example, the portable computer 600 may correspond to the portable computer shown in FIG. 7. The portable computer 600 includes a housing 602 having a button 604 attached thereto. The button 604 is configured to move through a hole 606 in the housing 602 in order to actuate some feature of the portable computer 600. For example, the button 604 may be used to release a locking mechanism that locks the lid to the base of the portable computer 600. The housing 602 itself is configured to enclose internal components of the portable computer 600. In the illustrated embodiment, the housing 602 encloses at least an indicator arrangement 608 for alerting the user when a computer event occurs. For example, the indicator arrangement 608 may be a used to indicate that the portable computer 600 is in a sleep mode. As shown, the indicator arrangement includes a light source 610, a light pipe 612, and a window 614. The light source 610, which is attached to a printed circuit board 616, is configured to emit light inside the housing 602. The light pipe 612, which is also attached to the printed circuit board 616, is configured to direct light from the light source 610 to the window 614. The window 614, which is incorporated within the button 604, is configured to allow the passage of light therethrough so as to allow light emanating from the light source 610, and more particularly light exiting the light pipe 612, to travel outside the housing 602, and more particularly the button 604. In most cases, the light exiting the window 614 is diffused in some manner so as to produce a uniform glow at the surface of the window 614.

As should be appreciated, the material that forms the light pipe 612 and window 614 must be suitable to facilitate the transmission of light therethrough. In some implementations, the material corresponds certain types of plastics or other translucent materials. In one particular implementation, the light pipe 612 includes a light receiving surface 620 and a light output surface 622. The light receiving surface 620 is generally located proximate the light source 610 so as to collect light therefrom., and the light output surface 622 is generally directed towards and proximate to the window 614 so as to transmit light thereto. The other surfaces of the light pipe 612 are typically reflective due to total internal reflection and thus they tend to concentrate light through the light output surface 622. Furthermore, the light source 610 may be selected from any suitable light emitting device. In the illustrated embodiment, the light source 610 corresponds to a side firing light emitting diode that directs light generally in one direction, as for example, the direction of the light receiving surface 620 of the light pipe 612.

The light pipe 612 may be configured to contact at least a portion of the window 614 or may include a gap therebetween. The later is generally preferred so as not to obstruct the button 604 when it is moved inward. Alternatively, the light pipe 612 may be integrally formed with the window 614 thereby moving with the button 604. In a similar vein, the light pipe 612 may be configured to contact at least a portion of the light source 610 or may include a gap therebetween.

It should be noted that the above configuration is not a limitation and that the indicator arrangement may vary according to the specific needs of each portable computer. For example, the window 614 may be located in a wall of the housing rather than the button. Furthermore, the light guide 612 may be attached to the housing 602 rather than to the circuit board 616.

While this invention has been described in terms of several preferred embodiments, there are alterations, permutations, and equivalents, which fall within the scope of this invention. For example, although the invention was described primarily in terms of a notebook computer, it should be noted that this is not a limitation and that the invention can be implemented in other computing devices and more particularly other consumer electronic products. That is, it is contemplated that the present invention, whether completely or in part, may be adapted for any of a number of suitable and known computing devices or consumer electronic products that perform useful functions via electronic components (e.g., audio, video, computing, etc.). By way of example, the present invention may be incorporated into general purpose computers such as desktop computers that sit on desks, floors or other surfaces (both segmented and all-in-one machines), portable or handheld devices such as personal digital assistants (PDAs), mobile phones, media players (MP3 players), cameras (both video and photos) and the like.

It should also be noted that there are many alternative ways of implementing the methods and apparatuses of the present invention. For example, although the ambient light level range was given as 0 to 1000 lux, it should be noted that this is not a limitation and that it may extend above this range. It is therefore intended that the following appended claims be interpreted as including all such alterations, permutations, and equivalents as fall within the true spirit and scope of the present invention.

What is claimed is:

1. A handheld electronic device, comprising:
   a light source;
   a light sensor;
   a light controller configured to process light information associated with the light sensor and the light source;
   a housing that encloses the light source, the light sensor, and the light controller, wherein the housing includes a plurality of openings and wherein the light sensor is configured to receive light through the plurality of openings; and
   an output device that conveys signals to a user through the plurality of openings.

2. The handheld electronic device defined in claim 1 wherein the light source comprises a portion of a display.

3. The handheld electronic device defined in claim 2 wherein the display comprises a liquid crystal display.

4. The handheld electronic device defined in claim 3 wherein the portion of the display comprises a light panel of the display.

5. The handheld electronic device defined in claim 1 wherein the light sensor comprises an ambient light sensor.

6. The handheld electronic device defined in claim 5, further comprising an additional ambient light sensor.

7. The handheld electronic device defined in claim 1, further comprising storage configured to store an illumination profile that defines a relationship between measured ambient light levels and light intensities of the light source.

8. The handheld electronic device defined in claim 7 wherein the light controller is configured to control the light source using the stored illumination profile.

9. The handheld electronic device defined in claim 8 wherein the stored illumination profile comprises a data table that includes the ambient light levels as inputs and the light intensities as outputs.

10. A mobile phone, comprising:
    a light source;
    an ambient light sensor;
    a housing that surrounds the light source and the ambient light sensor, wherein the housing includes at least one speaker opening and wherein the ambient light sensor is configured to receive ambient light through the at least one speaker opening; and
    a processor, wherein the processor is configured to process measured output from the ambient light sensor and light instructions for the light source.

11. The mobile phone defined in claim 10 wherein the processor is further configured to control an intensity of the light source based on the measured output from the ambient light sensor.

12. The mobile phone defined in claim 11 wherein the light source comprises a light source associated with a display.

13. The mobile phone defined in claim 12 wherein an intensity of light emitted by the display is based on the measured output from the ambient light sensor.

14. The mobile phone defined in claim 13 wherein the display includes liquid crystal cells.

15. The mobile phone defined in claim 14 wherein the display further comprises at least one polarizing filter.

16. The mobile phone defined in claim 14 wherein the display further comprises a glass plate.

17. The mobile phone defined in claim 12, further comprising an additional ambient light sensor that receives ambient light through the material.

18. A media player, comprising:
    a processor;
    a light source;
    a light sensor;
    a light controller coupled to the processor and configured to direct light information between the processor, the light sensor, and the light source; and
    a housing that encloses the processor, the light source, the ambient light sensor, and the light controller, wherein the housing includes a plurality of speaker openings and wherein the ambient light sensor is configured to receive light through the plurality of speaker openings.

* * * * *